United States Patent
Udou

(10) Patent No.: US 7,320,040 B2
(45) Date of Patent: Jan. 15, 2008

(54) DATA DISTRIBUTION SYSTEM

(75) Inventor: Satoshi Udou, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 151 days.

(21) Appl. No.: 10/545,017

(22) PCT Filed: May 11, 2004

(86) PCT No.: PCT/JP2004/006612

§ 371 (c)(1),
(2), (4) Date: Aug. 10, 2005

(87) PCT Pub. No.: WO2005/050922

PCT Pub. Date: Jun. 2, 2005

(65) Prior Publication Data

US 2006/0080480 A1    Apr. 13, 2006

(30) Foreign Application Priority Data

Nov. 21, 2003   (JP)   ............................. 2003-302869

(51) Int. Cl.
*G06F 3/00* (2006.01)
(52) U.S. Cl. ........................... 710/29; 710/30; 710/33; 710/38; 710/100; 710/107
(58) Field of Classification Search ................ 710/29, 710/30, 33, 38, 100, 107
See application file for complete search history.

(56) References Cited

U.S. PATENT DOCUMENTS 5,357,620 A * 10/1994 Suzuki ..................... 711/220

7,006,631 B1 * 2/2006 Luttrell et al. ............... 380/217
7,177,427 B1 * 2/2007 Komuro et al. ............. 380/239

FOREIGN PATENT DOCUMENTS

JP          11-122250 A       4/1999
JP          2003-150211 A     5/2003

OTHER PUBLICATIONS

CC-Link/LT Specification Ver. 1.00; translation of section 8.1.2.2; CC-Link Partner Association; undated.*
DeviceNet Communication Model and Communication Protocol; translation of sections 4.1,4.2,1.6.2, and 1.7; publisher ODVA; dated Mar. 31, 2002.*
CC-Link Specification Ver. 2.00; translation of section 8.1.2.2; CC-Link Partner Association; undated.*
JISB3511 Standard OPCN-1.
EN50170 Standard PROFIBUS, Mar. 1998.
IED62026 Standard AS-Interface, Jan. 31, 2002.
JISB3511 Standard OPCN-1, undated.

* cited by examiner

*Primary Examiner*—Glenn A. Auve
(74) *Attorney, Agent, or Firm*—Sughrue Mion, Pllc.

(57) ABSTRACT

A transfer apparatus receives, from a controller, a bit string including a plurality of individual data addressed to plural input/output units. The bit string is divided into data fragments. The data fragments are specified as corresponding to a target input/output unit. The specified data fragment is processed without performing a bit shift operation, and transmitted to the target input/output unit as a target data fragment. The input/output unit receives and stores template information that indicates an area within the target data fragment where the individual data is stored. The individual data is extracted from the target data fragment based on the template information.

1 Claim, 20 Drawing Sheets

FIG.3 RELATED ART

```
/* PROCESSING OF TRANSFER APPARATUS 121m */

/* CONSTANT DEFINITION */
#define M 64      /* MAXIMUM NUMBER OF STATIONS IN FIELD NETWORK */
#define N 64      /* MAXIMUM NUMBER OF STATIONS IN SENSOR/ACTUATOR NETWORK */
#define D123M_SIZE 16    /* SIZE (NUMBER OF BYTES) OF DATA IN TRANSMISSION FRAME 123m */

/* VARIABLE DEFINITION (SIZE OF UNSIGNED INT IS 8 BITS)*/
unsigned int d123m[D123M_SIZE];  /* DATA FIELD IN TRANSMISSION FRAME 123m */
unsigned int d123mn;             /* DATA FIELD IN TRANSMISSION FRAME 123mn */
unsigned int p123m;              /* VARIABLE USED FOR SPECIFYING ARGUMENT OF d123m */
unsigned int p123mn[N];          /* ARRAY VARIABLE USED FOR SPECIFYING ARGUMENT OF d123mn */
unsigned int nsub;               /* VARIABLE FOR STORING VALUE OBTAINED BY SUBTRACTING 1 FROM
                                    STATION NUMBER n OF INPUT/OUTPUT UNIT 122mn (1 ≤ STATION NUMBER n ≤ N) */
unsigned int n_of_122mn;         /* VARIABLE USED FOR SPECIFYING STATION NUMBER OF INPUT/
                                    OUTPUT UNIT 122mn */

/* INITIALIZATION OF VARIABLE */
n_of_122mn = 8;
nsub = n_of_122mn1 -1;
p123mn[nsub] =(2 * nsub) % 8;   /* NUMBER OF OUTPUTS OF INPUT/OUTPUT UNIT IS 2 BITS PER ONE
                                   STATION. DATA FOR FOUR STATIONS IS STORED IN ONE BYTE. */
                                                                                              } a /* FETCH VALUE OF DATA FIELD IN TRANSMISSION FRAME 123m */
get_field_network_data( d123m ) ;

/* EXTRACT DATA ADDRESSED TO INPUT/OUTPUT UNIT 122mn FROM d123m */
p123m = nsub /4;
d123mn = d123m[ p123m ];
d123mn >>= p123mn[ nsub ];
d123mn &= 0x03;

/* TRANSMIT d123mn TO INPUT/OUTPUT UNIT 122mn. */
send_sensor_actuator_network( n_of_122mn, d123mn );
```

FIG.4 RELATED ART

| (A) | (B) | (C) |
|---|---|---|
| /* PROCESSING OF TRANSFER APPARATUS 121m */ | OPERATION OF MICROCOMPUTER | REQUIRED NUMBER OF CLOCKS |
| /* FETCH DATA ADDRESSED TO INPUT/OUTPUT UNIT 122mn FROM d123m */<br>p123m = nsub / 4; | (1) STORE VALUE OF nsub IN REGISTER a<br>(2) SHIFT VALUE OF REGISTER a BY ONE BIT RIGHTWARD (IN A DIRECTION TOWARD LSB)<br>(3) SHIFT VALUE OF REGISTER a BY ONE BIT RIGHTWARD<br>(4) STORE VALUE OF REGISTER a IN p123m | 1<br>1<br>1<br>1<br>SUBTOTAL 4 CLOCKS 9% |
| d123mn = d123m[ p123m ]; | (5) STORE VALUE OF ADDRESS WHERE d123m[0] IS STORED IN REGISTER e<br>(6) STORE VALUE OF p123m IN REGISTER b<br>(7) ADD VALUE OF REGISTER b TO REGISTER e<br>(8) STORE DATA STORED IN ADDRESS INDICATED BY REGISTER a IN REGISTER e<br>(9) STORE VALUE OF REGISTER a IN d123mn | 1<br>1<br>1<br>1<br>1<br>SUBTOTAL 5 CLOCKS 11% |
| d123mn >>= p123mn[ nsub ]; | (10) STORE VALUE OF ADDRESS WHERE p123mn[0] IS STORED IN REGISTER e<br>(11) STORE VALUE OF nsub IN REGISTER b<br>(12) ADD VALUE OF REGISTER b TO REGISTER e<br>(13) STORE DATA STORED IN ADDRESS INDICATED BY REGISTER e IN REGISTER a<br>(14) SHIFT REGISTER a BY ONE BIT LEFTWARD<br>(15) STORE VALUE OF d123mn IN REGISTER b<br>(16) BRANCH TO (20), IF VALUE OF REGISTER a IS 0<br>(17) SHIFT VALUE OF REGISTER b BY ONE BIT RIGHTWARD<br>(18) SUBTRACT 1 FROM VALUE OF REGISTER a<br>(19) JUMP TO (17)<br>(20) STORE VALUE OF REGISTER b IN d123mn | 1<br>1<br>1<br>1<br>1<br>1<br>1×6 + 1<br>1×6<br>1×6<br>1×6<br>1<br>SUBTOTAL 33 CLOCKS 73% |
| d123mn &= 0x03; | (21) STORE VALUE OF d123mn IN REGISTER a<br>(22) PERFORM AND OPERATION OF REGISTER a AND 03 IN HEXADECIMAL NUMBER FROM<br>(23) STORE VALUE OF REGISTER a IN d123mn | 1<br>1<br>1<br>SUBTOTAL 3 CLOCKS 7%<br>TOTAL 45 CLOCK CYCLES |

FIG.5 RELATED ART

```
/* PROCESSING (1) OF INPUT/OUTPUT UNIT 122m8: WHEN OUTPUT PORT
HAS SAME ADDRESS */

/* CONSTANT DEFINITION */
#define OFF    0
#define ON     1

/* VARIABLE DEFINITION */
unsigned int d123mn;   /* DATA FIELD IN TRANSMISSION FRAME 123m (8
BITS) */

/* FETCH VALUE OF DATA FIELD IN TRANSMISSION FRAME 123mn */
get_sensor_actuator_network_data( d123mn );

/* DETERMINE OUTPUT STATE OF PORT mnPk (k=0 TO 1) */
mnP = d123mn;
```

FIG.6 RELATED ART

```
/* PROCESSING (2) OF INPUT/OUTPUT UNIT 122m8: WHEN OUTPUT PORT
HAS DIFFERENT ADDRESS */

/* CONSTANT DEFINITION */
#define OFF    0
#define ON     1

/* VARIABLE DEFINITION */
unsigned int d123mn;   /* DATA FIELD IN TRANSMISSION FRAME 123m (8
BITS) */
unsigned int maskmnP0 = 0x01;   /*CONSTANT TO BE USED FOR DECISION
OF mnP0 */
unsigned int maskmnP1 = 0x02;   /*CONSTANT TO BE USED FOR DECISION
OF mnP1 */

/* FETCH VALUE OF DATA FIELD IN TRANSMISSION FRAME 123mn */
get_sensor_actuator_network_data( d123mn );

/* DETERMINE OUTPUT STATE OF PORT mnPk (k=0 TO 1) */   ⎫
mnP0 = ((d123mn & maskmnP0)==0)? OFF : ON;             ⎬ b
mnP1 = ((d123mn & maskmnP1)==0)? OFF : ON;             ⎭
```

```
/* PROCESSING OF INPUT/OUTPUT UNIT 122m8 */

/* DETERMINE OUTPUT STATE OF PORT mnPk (k=0 TO 1) */
mnP0 = ((d123mn & maskmnP0)==0)? 0 : 1;

mnP1 = ((d123mn & maskmnP1)==0)? 0 : 1;
```

| (B) OPERATION OF MICROCOMPUTER | (C) REQUIRED NUMBER OF CLOCKS |
|---|---|
| (1) STORE VALUE OF d123mn IN REGISTER a | 1 |
| (2) STORE VALUE OF maskmnP0 IN REGISTER b | 1 |
| (3) PERFORM AND OPERATION OF REGISTER a AND REGISTER b | 1 |
| (4) BRANCH TO (6) WHEN VALUE OF REGISTER a IS 0 | 1 |
| (5) STORE 01 IN REGISTER a | 1 |
| (6) STORE VALUE OF REGISTER a IN mnP0 | 1  SUBTOTAL 6 CLOCKS |
| (7) STORE VALUE OF d123mn IN REGISTER a | 1 |
| (8) STORE VALUE OF maskmnP1 IN REGISTER b | 1 |
| (9) PERFORM AND OPERATION OF REGISTER a AND REGISTER b | 1 |
| (10) BRANCH TO (6) IF VALUE OF REGISTER a IS 0 | 1 |
| (11) STORE 01 IN REGISTER a | 1 |
| (12) STORE VALUE OF REGISTER a IN mnP1 | 1  SUBTOTAL 6 CLOCKS  TOTAL 12 CLOCK CYCLES |

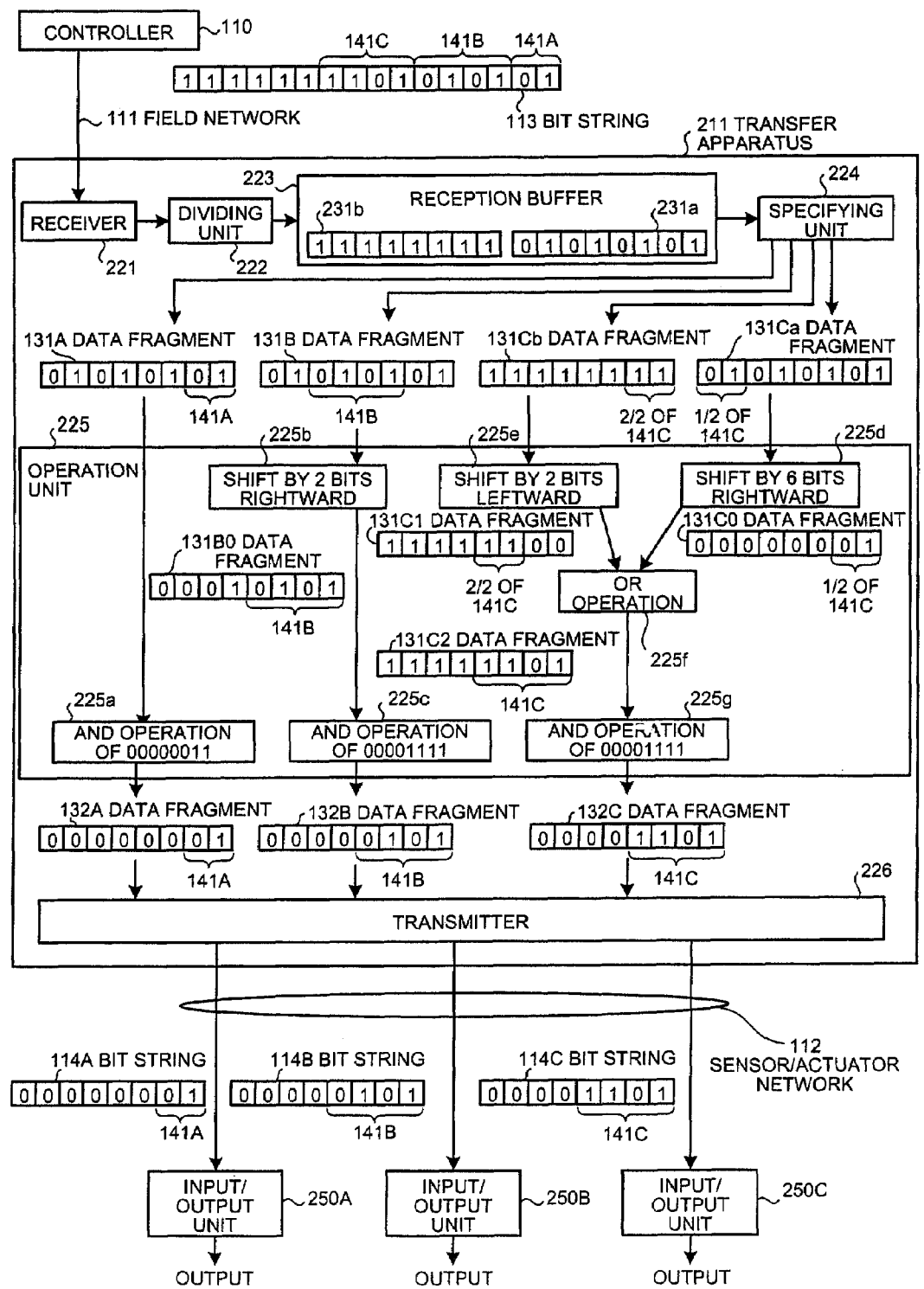
RELATED ART FIG.8

FIG.12 RELATED ART

```
/* PROCESSING OF TRANSFER APPARATUS 211 */

/* CONSTANT DEFINITION */
#define M 64            /* MAXIMUM NUMBER OF STATIONS IN FIELD NETWORK */
#define N 64            /* MAXIMUM NUMBER OF STATIONS IN SENSOR/ACTUATOR NETWORK */
#define D113_SIZE 16    /* SIZE (NUMBER OF BYTES) OF DATA IN TRANSMISSION FRAME 123m */
#define N_OF_250A 1     /* TOP STATION NUMBER IN INPUT/OUTPUT UNIT 250A */
#define N_OF_250B 2     /* TOP STATION NUMBER IN INPUT/OUTPUT UNIT 250B */
#define N_OF_250C 4     /* TOP STATION NUMBER IN INPUT/OUTPUT UNIT 250C */
#define SIZE_OF_250A 2  /* NUMBER OF OUTPUTS FROM INPUT/OUTPUT UNIT 250A (2 BITS) */
#define SIZE_OF_250B 4  /* NUMBER OF OUTPUTS FROM INPUT/OUTPUT UNIT 250B (4 BITS) */
#define SIZE_OF_250C 4  /* NUMBER OF OUTPUTS FROM INPUT/OUTPUT UNIT 250C (4 BITS) */
#define MASK_OF_250A 0x03  /* CONSTANT FOR INPUT/OUTPUT UNIT 250A */
#define MASK_OF_250B 0x0F  /* CONSTANT FOR INPUT/OUTPUT UNIT 250B */
#define MASK_OF_250C 0x0F  /* CONSTANT FOR INPUT/OUTPUT UNIT 250C */
#define TRUE 0x01
#define FALSE 0x00

/* VARIABLE DEFINITION (SIZE OF unsigned int IS 8 BITS)
unsigned int d113[D113_SIZE] ;  /* ARRAY FOR ACCESSING BIT STRING 113 RECEIVED BY TRANSFER
APPARATUS 211 */
unsigned int p113;              /* VARIABLE USED FOR SPECIFYING ARGUMENT OF d113 */
unsigned int n250q[N];          /* ARRAY VARIABLE FOR STORING STATION NUMBER OF INPUT/
OUTPUT UNIT */
unsigned int p250q[N];          /* ARRAY VARIABLE USED FOR SPECIFYING ARGUMENT OF d250q */
unsigned int size250q[N];       /* ARRAY VARIABLE FOR STORING NUMBER OF OUTPUTS OF INPUT/
OUTPUT UNIT */
unsigned int flag_of_separate[N];  /* ARRAY VARIABLE IN WHICH TRUE IS STORED, WHEN DATA 141q
SPANS OVER 2 BYTES */
unsigned mask250q[N];           /* ARRAY VARIABLE FOR STORING CONSTANT TO BE LOGICALLY
MULTIPLIED BY INPUT/OUTPUT UNIT */
unsigned int nsub;              /* VARIABLE FOR STORING VALUE OBTAINED BY SUBTRACTING 1
FROM STATION NUMBER N OF INPUT/OUTPUT UNIT (1 ≤ STATION NUMBERn ≤ N) */
unsigned int d132q;             /* DATA FIELD IN FRAME TO BE TRANSMITTED TO INPUT/OUTPUT
UNIT */
unsigned int d250qb;            /* TEMPORARY VARIABLE */
int q;                          /* TEMPORARY VARIABLE */

/* INITIALIZATION OF VARIABLES */
n250q[0] = N_OF_250A - 1;
n250q[1] = N_OF_250B - 1;
n250q[2] = N_OF_250C - 1;
p250q[n250q[0]] = (2 * n250q[0]) % 8;
p250q[n250q[1]] = (2 * n250q[1]) % 8;
p250q[n250q[2]] = (2 * n250q[2]) % 8;
size250q[n250q[0]] = SIZE_OF_250A;
size250q[n250q[1]] = SIZE_OF_250B;
size250q[n250q[2]] = SIZE_OF_250C;
flag_of_separate[n250q[0]] = ((p250q[n250q[0]]==6) && (size250q[n250q[0]]==4))? TRUE : FALSE;
flag_of_separate[n250q[1]] = ((p250q[n250q[1]]==6) && (size250q[n250q[1]]==4))? TRUE : FALSE;
flag_of_separate[n250q[2]] = ((p250q[n250q[2]]==6) && (size250q[n250q[2]]==4))? TRUE : FALSE;
mask250q[n250q[0]] = MASK_OF_250A
mask250q[n250q[1]] = MASK_OF_250B
mask250q[n250q[2]] = MASK_OF_250C /* FETCH VALUE OF BIT STRING 13 */
get_field_network_data( d113 ) ;

for(q = 0; q!=3; q++) {
  /* EXTRACT DATA ADDRESSED TO INPUT/OUTPUT UNIT 250q FROM d113 */
  nsub = n250q[q];
  p113 = nsub / 4;
  d132q = d113[p113];       ⎫
  d132q >>= p250q[nsub];    ⎪
  if(flag_of_separate[nsub]){ ⎪
    d250qb = d113[p113 + 1]; ⎬ C
    d250qb <<= 2;            ⎪
    d132q |= d250qb;         ⎪
  }                          ⎪
  d132q &= mask250q[nsub];   ⎭

/* TRANSMIT d132q TO INPUT/OUTPUT UNIT 250q */
  send_sensor_actuator_network( nsub+1, d132q );
}
```

RELATED ART

| (A) | (B) OPERATION OF MICROCOMPUTER | REQUIRED NUMBER OF CLOCKS | |
|---|---|---|---|
| /* PROCESSING OF TRANSFER APPARATUS 211 */ | | | |
| /* WHEN q=0 */ d132q >>= p250q[nsub]; | (1) STORE VALUE OF ADDRESS WHERE p250q[0] IS STORED IN REGISTER e<br>(2) STORE VALUE OF nsub IN REGISTER b<br>(3) ADD VALUE OF REGISTER b TO REGISTER e<br>(4) STORE DATA STORED IN ADDRESS INDICATED BY REGISTER e IN REGISTER a<br>(5) STORE VALUE OF d132q IN REGISTER b<br>(6) BRANCH TO (10), IF VALUE OF REGISTER a IS 0<br>(7) SHIFT VALUE OF REGISTER b BY ONE BIT RIGHTWARD<br>(8) SUBTRACT 1 FROM REGISTER a<br>(9) JUMP TO (6)<br>(10) STORE VALUE OF REGISTER b IN d132q | 1<br>1<br>1<br>1<br>1<br>0<br>0<br>0<br>1 | SUBTOTAL 7 CLOCKS 7% |
| if(flag_of_separate[nsub]) { | (11) STORE VALUE OF ADDRESS WHERE FLAG_OF_SEPARATE[0] IS STORED IN REGISTER e<br>(12) STORE VALUE OF nsub IN REGISTER b<br>(13) ADD VALUE OF REGISTER b TO REGISTER e<br>(14) STORE DATA STORED IN ADDRESS INDICATED BY REGISTER e IN REGISTER a<br>(15) BRANCH TO (26) WHEN VALUE OF REGISTER a IS 0X00 | 1<br>1<br>1<br>1<br>1 | SUBTOTAL 5 CLOCKS 5% |
| d250qb = d113p113 + 1]; | (16) STORE VALUE OF ADDRESS WHERE d113[0] IS STORED IN REGISTER e<br>(17) STORE VALUE OF p113 IN REGISTER b<br>(18) ADD 1 TO REGISTER b<br>(19) ADD VALUE OF REGISTER b TO REGISTER e<br>(20) STORE DATA STORED IN ADDRESS INDICATED BY REGISTER e IN REGISTER a | 0<br>0<br>0<br>0<br>0 | SUBTOTAL 0 CLOCKS 0% |
| d250qb <<= 2; | (21) SHIFT VALUE OF REGISTER a BY ONE BIT LEFTWARD (TOWARD MSB)<br>(22) SHIFT VALUE OF REGISTER a BY ONE BIT LEFTWARD (TOWARD MSB) | 0<br>0 | SUBTOTAL 0 CLOCKS 0% |
| d132q \|= d250qb;<br>) | (23) STORE VALUE OF d132q IN REGISTER b<br>(24) PERFORM OR OPERATION OF REGISTER a AND REGISTER b<br>(25) STORE VALUE OF REGISTER b IN d132q | 0<br>0<br>0 | SUBTOTAL 0 CLOCKS 0% |
| d132q &=mask250q[nsub]; | (26) STORE VALUE OF d132q IN REGISTER a<br>(27) STORE VALUE OF ADDRESS WHERE mask250q[0] IS STORED IN REGISTER e<br>(28) STORE VALUE OF nsub IN REGISTER b<br>(29) ADD VALUE OF REGISTER b TO REGISTER e<br>(30) STORE DATA STORED IN ADDRESS INDICATED BY REGISTER b TO REGISTER e<br>(31) PERFORM AND OPERATION OF REGISTER a AND REGISTER b<br>(32) STORE VALUE OF REGISTER a IN d132q | 1<br>1<br>1<br>1<br>1<br>1<br>1 | SUBTOTAL 7 CLOCKS 7% |
| /* WHEN q=1 */<br>d132q >>= p250q[nsub];<br>if(flag_of_separate[nsub]) {<br>d250qb = d113[p113 + 1];<br>d250qb <<= 2;<br>d132q \|= d250qb;<br>}<br>d132q &=mask250q[nsub]; | (1) TO (10)<br>(11) TO (15) PERFORM BIT SHIFT PROCESSING<br>EXECUTE (16) TO (25) WHEN DATA 141q SPANS OVER A PLURALITY OF BYTES<br>(16) TO (20) READ DATA TO BE SHIFTED<br>(21) TO (22) PERFORM BIT SHIFT PROCESSING<br>(23) TO (25) REDUCE DATA TO 1 BYTE<br>(26) TO (32) SET BITS OTHER THAN DATA 141q TO 0 | 5+(1+4×2)+1<br>5<br>0<br>0<br>0<br>0<br>7 | SUBTOTAL 15 CLOCKS 15%<br>SUBTOTAL 5 CLOCKS 5%<br>SUBTOTAL 0 CLOCKS 0%<br>SUBTOTAL 0 CLOCKS 0%<br>SUBTOTAL 0 CLOCKS 0%<br>SUBTOTAL 0 CLOCKS 0%<br>SUBTOTAL 7 CLOCKS 7% |
| /* WHEN q=2 */<br>d132q >>= p250q[nsub];<br>if(flag_of_separate[nsub]) {<br>d250qb = d113[p113 + 1];<br>d250qb <<= 2;<br>d132q \|= d250qb;<br>}<br>d132q &=mask250q[nsub]; | (1) TO (10)<br>(11) TO (15) PERFORM BIT SHIFT PROCESSING<br>EXECUTE (16) TO (25) WHEN DATA 141q SPANS OVER A PLURALITY OF BYTES<br>(16) TO (20) READ DATA TO BE SHIFTED<br>(21) TO (22) PERFORM BIT SHIFT PROCESSING<br>(23) TO (25) REDUCE DATA TO 1 BYTE<br>(26) TO (32) SET BITS OTHER THAN DATA 141q TO 0 | 5+(1+4×6)+1<br>5<br>5<br>2<br>3<br>7 | SUBTOTAL 31 CLOCKS 31%<br>SUBTOTAL 5 CLOCKS 5%<br>SUBTOTAL 5 CLOCKS 5%<br>SUBTOTAL 2 CLOCKS 2%<br>SUBTOTAL 3 CLOCKS 3%<br>SUBTOTAL 7 CLOCKS 7%<br>TOTAL 99 CLOCK CYCLES |

FIG. 18

```
/* PROCESSING OF TRANSFER APPARATUS 20 */

/* CONSTANT DEFINITION */
#define M 64           /* MAXIMUM NUMBER OF STATIONS IN FIELD NETWORK */
#define N 64           /* MAXIMUM NUMBER OF STATIONS IN SENSOR/ACTUATOR NETWORK */
#define D13_SIZE 16    /* SIZE (NUMBER OF BYTES) OF DATA IN TRANSMISSION FRAME 123m */
#define N_OF_50A 1     /* TOP STATION NUMBER IN INPUT/OUTPUT UNIT 50A */
#define N_OF_50B 2     /* TOP STATION NUMBER IN INPUT/OUTPUT UNIT 50B */
#define N_OF_50C 4     /* TOP STATION NUMBER IN INPUT/OUTPUT UNIT 50C */
#define SIZE_OF_50A 2     /* NUMBER OF OUTPUTS FROM INPUT/OUTPUT UNIT 50A (2 BITS) */
#define SIZE_OF_50B 4     /* NUMBER OF OUTPUTS FROM INPUT/OUTPUT UNIT 50B (4 BITS) */
#define SIZE_OF_50C 4     /* NUMBER OF OUTPUTS FROM INPUT/OUTPUT UNIT 50C (4 BITS) */
#define TRUE 0x01
#define FALSE 0x00

/* VARIABLE DEFINITION (SIZE OF unsigned int IS 8 BITS) */
unsigned int d13[D13_SIZE]; /* ARRAY FOR ACCESSING BIT STRING 13 RECEIVED BY TRANSFER
APPARATUS 20 */
unsigned int p13;       /* VARIABLE USED FOR SPECIFYING ARGUMENT OF d13 */
unsigned int n50q[N];   /* ARRAY VARIABLE FOR STORING STATION NUMBER OF INPUT/OUTPUT UNIT */
unsigned int p50q[N];   /* ARRAY VARIABLE USED FOR SPECIFYING ARGUMENT OF d50q */
unsigned int size50q[N];  /* ARRAY VARIABLE FOR STORING NUMBER OF OUTPUTS OF INPUT/OUTPUT
UNIT */
unsigned int flag_of_separate[N]; /* ARRAY VARIABLE IN WHICH TRUE IS STORED, WHEN DATA 41q
SPANS OVER 2 BYTES */
unsigned int nsub;      /* VARIABLE FOR STORING VALUE OBTAINED BY SUBTRACTING 1 FROM STATION
NUMBER N OF INPUT/OUTPUT UNIT (1 ≤ STATION NUMBERn ≤ N) */
unsigned int d32q;      /* DATA FIELD IN FRAME TO BE TRANSMITTED TO INPUT/OUTPUT UNIT */
unsigned int d50qb;     /* TEMPORARY VARIABLE */
int q;                  /* TEMPORARY VARIABLE */

/* INITIALIZATION OF VARIABLES */
n50q[0] = N_OF_50A - 1;
n50q[1] = N_OF_50B - 1;
n50q[2] = N_OF_50C - 1;
p50q[n50q[0]] = (2 * n50q[0]) % 8;
p50q[n50q[1]] = (2 * n50q[1]) % 8;
p50q[n50q[2]] = (2 * n50q[2]) % 8;
size50q[n50q[0]] = SIZE_OF_50A;
size50q[n50q[1]] = SIZE_OF_50B;
size50q[n50q[2]] = SIZE_OF_50C;
flag_of_separate[n50q[0]] = ((p50q[n50q[0]]==6) && (size50q[n50q[0]]==4))? TRUE : FALSE;
flag_of_separate[n50q[1]] = ((p50q[n50q[1]]==6) && (size50q[n50q[1]]==4))? TRUE : FALSE;
flag_of_separate[n50q[2]] = ((p50q[n50q[2]]==6) && (size50q[n50q[2]]==4))? TRUE : FALSE;

/* FETCH VALUE OF BIT STRING 13 */
get_field_network_data( d13 );

for(q = 0; q!=3; q++){
    /* EXTRACT DATA ADDRESSED TO INPUT/OUTPUT UNIT 50q FROM d13 */
    nsub = n50q[q];
    p13 = nsub / 4;
    d32q = d13[p13];
    if(flag_of_separate[nsub]){
        d32q &= 0xC0;
        d50qb = d13[p13 + 1];       } d
        d50qb &= 0x03;
        d32q |= d50qb;
    }

/* TRANSMIT d32q TO INPUT/OUTPUT UNIT 50q */
    send_sensor_actuator_network( nsub+1, d32q );
}
```

FIG.19

| (A) /* PROCESSING OF TRANSFER APPARATUS 20 */ | (B) OPERATION OF MICROCOMPUTER | (C) REQUIRED NUMBER OF CLOCKS |
|---|---|---|
| /* WHEN q=0 */<br>if(flag_of_separate[nsub]) { | (1) STORE VALUE OF ADDRESS WHERE flag_of_separate[0] IS STORED IN REGISTER e<br>(2) STORE VALUE OF nsub IN REGISTER b<br>(3) ADD VALUE OF REGISTER b TO REGISTER e<br>(4) STORE DATA STORED IN ADDRESS INDICATED BY REGISTER e IN REGISTER a<br>(5) BRANCH TO NEXT PROCESSING (PROCESSING SUBSEQUENT TO (20)) WHEN VALUE OF REGISTER a IS 0x00 | 1<br>1<br>1<br>1<br>1<br>SUBTOTAL 5 CLOCKS 17% |
| d32q &= 0x0C0; | (6) STORE VALUE OF d32q IN REGISTER b<br>(7) PERFORM AND OPERATION OF REGISTER a AND 0x0C0<br>(8) STORE VALUE OF REGISTER a IN d32q | 0<br>0<br>0<br>SUBTOTAL 0 CLOCKS 0% |
| d50qb = d13[p13 + 1]; | (9) STORE VALUE OF ADDRESS WHERE d13[0] IS STORED IN REGISTER a<br>(10) STORE VALUE OF p13 IN REGISTER b<br>(11) ADD 1 TO REGISTER b<br>(12) ADD VALUE OF REGISTER b TO REGISTER e<br>(13) STORE DATA STORED IN ADDRESS INDICATED BY REGISTER e IN REGISTER a | 0<br>0<br>0<br>0<br>0<br>SUBTOTAL 0 CLOCKS 0% |
| d50qb &= 0x03; | (14) STORE VALUE OF d50qb IN REGISTER a<br>(15) PERFORM AND OPERATION OF REGISTER a AND 0x03<br>(16) STORE VALUE OF REGISTER a IN d50q | 0<br>0<br>0<br>SUBTOTAL 0 CLOCKS 0% |
| d32q \|= d50qb;<br>} | (17) STORE VALUE OF d32q IN REGISTER a<br>(18) STORE VALUE OF d50qb IN REGISTER b<br>(19) PERFORM AND OPERATION OF REGISTER a AND REGISTER b<br>(20) STORE VALUE OF REGISTER a IN d32q | 0<br>0<br>0<br>0<br>SUBTOTAL 0 CLOCKS 0% |
| /* WHEN q=1 */<br>if(flag_of_separate[nsub]) {<br>d32q &= 0x0C0;<br>d50qb = d13[p13 + 1];<br>d50qb &= 0x03;<br>d32q \|= d50qb;<br>} | (1) TO (5) EXECUTE (6) TO (20) WHEN DATA 41q SPANS OVER A PLURALITY OF BYTES<br>(6) TO (8) SET BITS OTHER THAN 1/2 OF DATA 41q TO 0<br>(9) TO (13) EXTRACT 2/2 OF DATA 41q<br>(14) TO (16) SET BITS OTHER THAN 2/2 OF DATA 41q TO 0<br>(17) TO (20) REDUCE DATA TO 1 BYTE | 5 SUBTOTAL 5 CLOCKS 17%<br>0 SUBTOTAL 0 CLOCKS 0%<br>0 SUBTOTAL 0 CLOCKS 0%<br>0 SUBTOTAL 0 CLOCKS 0%<br>0 SUBTOTAL 0 CLOCKS 0% |
| /* WHEN q=2 */<br>if(flag_of_separate[nsub]) {<br>d32q &= 0x0C0;<br>d50qb = d13[p13 + 1];<br>d50qb &= 0x03;<br>d32q \|= d50qb;<br>} | (1) TO (5) EXECUTE (6) TO (20) WHEN DATA 41q SPANS OVER A PLURALITY OF BYTES<br>(6) TO (8) SET BITS OTHER THAN 1/2 OF DATA 41q TO 0<br>(9) TO (13) EXTRACT 2/2 OF DATA 41q<br>(14) TO (16) SET BITS OTHER THAN 2/2 OF DATA 41q TO 0<br>(17) TO (20) REDUCE DATA TO 1 BYTE | 5 SUBTOTAL 5 CLOCKS 17%<br>3 SUBTOTAL 3 CLOCKS 10%<br>5 SUBTOTAL 5 CLOCKS 17%<br>3 SUBTOTAL 3 CLOCKS 10%<br>4 SUBTOTAL 4 CLOCKS 13%<br>TOTAL 30 CLOCKS |

FIG.20

```
/* PROCESSING OF INPUT/OUTPUT UNIT 50q */

/* CONSTANT DEFINITION */
#define OFF   0x00
#define ON    0x01

/* VARIABLE DEFINITION */
unsigned int d52q;    /* DATA STORAGE UNIT 52q */
unsigned int t55q0;   /* TEMPLATE STORAGE UNIT 55q0 */
unsigned int t55q1;   /* TEMPLATE STORAGE UNIT 55q1*/
unsigned int t55q2;   /* TEMPLATE STORAGE UNIT 55q2 */
unsigned int t55q3;   /* TEMPLATE STORAGE UNIT 55q3 */

/* IN CASE OF INPUT/OUTPUT UNIT 50A */
if(node_number==N01A) {
  t55q0 = 0x01;
  t55q0 = 0x02;
}
/* IN CASE OF INPUT/OUTPUT UNIT 50B */
if(node_number==N01B) {
  t55q0 = 0x04;
  t55q1 = 0x08;
  t55q2 = 0x10;
  t55q3 = 0x20;
}
/* IN CASE OF INPUT/OUTPUT UNIT 50C */
if(node_number==N01C) {
  t55q0 = 0x40;
  t55q1 = 0x80;
  t55q2 = 0x01;
  t55q3 = 0x02;
}

/* FETCH VALUE OF DATA FIELD IN TRANSMISSION FRAME 123mn */
get_sensor_actuator_network_data( d52q );

/* DETERMINE OUTPUT STATE OF OUTPUT 54qk (k=0 TO 1 OR 3) */
P0 = ((d52q & t55q0)==0x00)? OFF : ON;   /* OUTPUT54q0 */  ⎫
P1 = ((d52q & t55q1)==0x00)? OFF : ON;   /* OUTPUT54q1 */  ⎬ e
P2 = ((d52q & t55q2)==0x00)? OFF : ON;   /* OUTPUT54q2 */
P3 = ((d52q & t55q3)==0x00)? OFF : ON;   /* OUTPUT54q3 */
```

FIG.21

| (A) | (B) | (C) |
|---|---|---|
| | OPERATION OF MICROCOMPUTER | REQUIRED NUMBER OF CLOCKS |
| /* PROCESSING OF INPUT/OUTPUT UNIT 50q */<br><br>/* DETERMINE OUTPUT STATE OF OUTPUT 54qk (k=0 TO 1 OR 3) */<br>P0 = ((d52q & t55q0)==0x00)? OFF : ON; /*<br>OUTPUT54q0 */ | (1) STORE VALUE OF d52q IN REGISTER a<br>(2) STORE VALUE OF t55q0 IN REGISTER b<br>(3) PERFORM AND OPERATION OF REGISTER a AND REGISTER b<br>(4) BRANCH TO (6) IF VALUE OF REGISTER a IS 0<br>(5) STORE 01 IN REGISTER a<br>(6) STORE VALUE OF REGISTER a IN P0 | 1<br>1<br>1<br>1<br>1<br>1 SUBTOTAL 6 CLOCKS |
| P1 = ((d52q & t55q1)==0x00)? OFF : ON; /*<br>OUTPUT54q1 */ | (7) STORE VALUE OF d52q IN REGISTER a<br>(8) STORE VALUE OF t55q1 IN REGISTER b<br>(9) PERFORM AND OPERATION OF REGISTER a AND REGISTER b<br>(10) BRANCH TO (12) IF VALUE OF REGISTER a IS 0<br>(11) STORE 01 IN REGISTER a<br>(12) STORE VALUE OF REGISTER a IN P1 | 1<br>1<br>1<br>1<br>1<br>1 SUBTOTAL 6 CLOCKS<br>TOTAL 12 CLOCK CYCLES |

DATA DISTRIBUTION SYSTEM

TECHNICAL FIELD

The present invention relates to a data distribution system used in a field of control.

BACKGROUND ART

In the field of control, data distribution systems in which one controller controls a plurality of input/output units, arranged at positions away from the controller by several to several hundreds of meters, via a network have been widely put into practical use. Conventionally, the number of inputs and outputs per input/output unit (one unit is equal to one bit) ranges from 8 to 64. However, based on user demands, the number of inputs and outputs per input/output unit ranges from 1 to 8, in some recent input/output units. The network to be used is referred to as a field network for the former case, and as a sensor/actuator network for the latter case, due to the background of establishment in the market and a difference in the number of inputs and outputs of the input/output units. The technical standards for the field network and the sensor/actuator network have been published by government organizations and private organizations (Non-patent Literatures 1 to 6).

The outline of a conventional data distribution system will be explained with reference to FIGS. 1 to 13. In the specification, a network in which the number of inputs and outputs of the input/output unit is 8 or more is referred to as the field network, and a network in which the number of inputs and outputs of the input/output unit is less than 8 is referred to as the sensor/actuator network.

In the data distribution system used in the field of control, the controller controls the input/output information of several tens to several thousands inputs/outputs via the field network or the sensor/actuator network. That is, the controller monitors the input state of an input unit and controls the output state of an output unit. Therefore, as shown in FIG. 1, recent networks have been made hierarchical such that the inputs of from several hundreds to several thousands are divided into small groups of inputs of several tens, and data transmission within each group is performed via the sensor/actuator network.

FIG. 1 is a conceptual diagram when the field network and the sensor/actuator network are hierarchical. In FIG. 1, a controller 110 is connected to a field network 111 having a length of from several tens to several thousands of meters, and m groups (m=1 to M) are connected to the field network 111. A transfer apparatus 121$m$ connected to the field network 111 is arranged in the group m. A plurality of input/output units 122 . . . are connected to the transfer apparatus 121$m$ via a sensor/actuator network 112 having a length of from several to several hundreds of meters. That is, the transfer apparatus 121$m$ transmits to the controller 110, input state data received from the input/output units 122 . . . belonging to its own group, and also distributes control data received from the controller 110 to the input/output units 122 . . . of its own group.

FIG. 2 is a diagram for explaining data distribution to the input/output units performed in one group shown in FIG. 1. FIG. 2 depicts a case that the controller 110 transmits onto the field network 111, a transmission frame 123$m$ addressed to group m, for controlling the output state of the input/output unit 122$mn$ in the group m, and the transfer apparatus 121$m$ in the group m creates a transmission frame 123$mn$ addressed to the input/output unit 122$mn$ from the transmission frame 123$m$ received from the field network 111, to transmit the data to the sensor/actuator network 112.

The transmission frame 123$m$ is a bit string including a header field 71, a data field 72, and a check field 73. The transmission frame 123$mn$ is a bit string including a header field 75, a data field 76, and a check field 77. The configuration of such a transmission frame is generally used in a serial communication, and the similar configuration is used in the Non-patent Literatures 1 to 6. The correspondence between the bit arrangement in the data field and the input/output ports of the input/output units is determined fixedly such that the least significant bit (LSB) represents the state of the 0-th input/output port.

The unit in the data field in the transmission frame specified in the Non-patent Literatures 1, 2, and 5 is 1 byte. The unit in the data field in the transmission frame specified in the Non-patent Literature 4 is 4 or 2 bytes. The unit in the data field in the transmission frame specified in the Non-patent Literature 3 is 0.5 byte (4 bits are fixed). The unit in the data field in the transmission frame specified in the Non-patent Literature 6 is 0.5 byte, 1 byte, or 2 bytes.

In FIG. 2, therefore, it is assumed that in the transmission frame 123$m$ to be transmitted to the field network 111 by the controller 110, the unit in the data field 72 is 1 byte. Further, it is assumed that in the transmission frame 123$mn$ to be transmitted to the sensor/actuator network 112 by the transfer apparatus 121$m$, the unit in the data field 76 is 1 byte. The one-to-one correspondence between the bit position in the data field and the input/output port is determined fixedly.

That is, the data field 72 in the transmission frame 123$m$ includes 2×N bits (N is a multiple of 4), the first bit on the header field 71 side is the least significant bit (LSB), and the last bit on the check field 73 side is the most significant bit (MSB). In FIG. 2, it is shown that the input/output unit 122$mn$ has two output ports mnP0 and mnP1, and hence, 2 bit data addressed to the respective input/output units 122$mn$ is stored in the data field 72. In other words, the first and the second bits are data addressed to an input/output unit 122$m$1, and the third bit and the fourth bit are data addressed to an input/output unit 122$m$2.

In the transmission frame 123$mn$, the data field 76 includes 8 bits, the first bit b0 on the header field 75 side is the least significant bit (LSB), and the eighth bit b7 on the check field 77 side is the most significant bit (MSB).

The transfer apparatus 121$m$ receives the transmission frame 123$m$, and fetches the (2×(m−1)+1)th bit to the (2×m)th bit in the data field 72 of the transmission frame 123$m$, in order to create the transmission frame 123$mn$, and stores these data in bits b0 to b1 in the data field 76 of the transmission frame 123$mn$, and stores "0" in bits b2 to b7. That is, in the depicted example, "00000001" is stored in the data field 76.

The input/output unit 122$mn$ extracts the data field 76 from the transmission frame 123$mn$ that is fetched from the sensor/actuator network 112, to determine the ON/OFF state of an output port mnPk (k=0, 1) according to the logical state of the first bit b0 and the second bit b1 in the data field 76. That is, in an output port mnP0, when b0="1", the output state is set to ON, and when b0="0", the output state is set to OFF. Likewise, in an output port mnP1, when b1="1", the output state is set to ON, and when b1="0", the output state is set to OFF. In the example shown in FIG. 2, since b0="1" and b1="0", the output state of the output port mnP0 is ON, and the output state of the output port mnP1 is OFF.

The processing content in which the transfer apparatus 121$m$ creates the transmission frame 123$mn$ addressed to the input/output unit 122mn from the transmission frame 123m will be specifically explained with reference to FIGS. 3 and 4.

FIG. 3 illustrates a process in which the transfer apparatus 121m uses an 8-bit microcomputer to create the transmission frame 123mn to be distributed to an input/output unit 122m8 having a station number 8, from the transmission frame 123m. FIG. 4 is a diagram for explaining the processing content related to part "a" shown in FIG. 3.

In FIG. 3, the transfer apparatus 121m defines constants and variables, and after initializing the variables, obtains the value in the data field 72 in the transmission frame 123m according to a function get_field_network_data( ). The transfer apparatus 121m then stores d123m[1] from an array variable d123m, which is data addressed to station number 8, in a variable d123mn based on station number n=8. The transfer apparatus 121m then shifts the variable d123mn rightward (in a direction toward the LSB) by 6 bits, which is the number of bits obtained by multiplying 2 by 3, which is a surplus obtained by dividing "8-1" by 4, so that data addressed to the input/output unit 122m8 is stored in order of from the LSB of the variable d123mn. Lastly, AND operation of the variable d123mn and 0×03 (hexadecimal) is performed in order to set 0 into the bits storing no data. Thus, generation of data d123mn is complete, and the data d123mn is transmitted according to a function send_sensor_actuator_network( ).

In FIG. 4, the processing in part "a" shown in FIG. 3 is shown in column (A), a processing operation actually performed by a microcomputer is shown in column (B), and the required number of clock cycles is shown in column (C). As shown in column (C), as for the number of clock cycles required when the microcomputer executes a command, if one clock cycles is required for one command, in the case of station number n=8, a total of 45 clock cycles are required for the processing for 4 lines in the part "a" shown in FIG. 3, and 33 clock cycles are required for the bit shift processing.

A process in which the input/output unit 122m8 determines an output state mnPk from the transmission frame 123mn will be explained specifically with reference to FIGS. 5 to 7. FIGS. 5 and 6 illustrate a case that the input/output unit 122m8 uses an 8-bit microcomputer to determine the output state mnPk from the transmission frame 123mn. FIG. 5 depicts an example in which an output port has the same address, and FIG. 6 depicts an example in which the output port has a different address. FIG. 7 depicts details of the processing content relating to part "b" shown in FIG. 6.

In FIGS. 5 and 6, the input/output unit 122m8 defines a constant in a constant defining section, declares variables in a variable defining section, and then obtains the value in the data field 76 in the transmission frame 123mn according to a function get_sensor_actuator_network_data( ) into a variable d123mn. Based on the value of the low-order 2 bits in the variable d123mn, when the value is 1, the output state of the output port mnPk is turned ON, and when the value is 0, the output state of the output port mnPk is turned OFF.

In FIG. 7, the processing in part "b" shown in FIG. 6 is shown in column (A), a processing operation actually performed by a microcomputer is shown in column (B), and the required number of clock cycles is shown in column (C). As shown in column (C), as for the number of clock cycles required when the microcomputer executes a command, if one clock cycles is required for one command, a total of 12 clock cycles are required for the processing for the 2 lines in part "b" shown in FIG. 6.

FIG. 8 is a diagram for explaining the configuration of a conventional hierarchical data distribution system and contents of the process procedure of the transfer apparatus. FIG. 8 illustrates a case in which the controller 110, which controls the whole system, performs setting control of a state quantity output to an object to be controlled, to three input/output units 250q (q=A, B, C) via a transfer apparatus 211. As described above, the transfer apparatus 211 is connected to the controller 110 via the field network 111, and to the input/output units 250q via the sensor/actuator network 112. The configuration and the contents of the process procedure of the input/output units 250q shown in FIG. 8 are shown in FIGS. 9 to 11.

In FIG. 8, the transfer apparatus 211 includes a receiver 221, a dividing unit 222, a reception buffer 223, a specifying unit 224, an operation unit 225, and a transmitter 226. Upon receiving a transmission frame transmitted by the controller 110 via the field network 111, the receiver 221 extracts a bit string 113 including a data field, and provides the bit string to the dividing unit 222.

In FIG. 8, the bit string 113 includes 16 bits. The positions of the LSB and the MSB in the bit string 113 are displayed in the opposite direction to those shown in FIG. 2. In the bit string 113, the first and the second bits on the lowest order side indicate data 141A transmitted to the input/output unit 250q (q=A). The third to the sixth bits indicate data 141B transmitted to the input/output unit 250q (q=B). The seventh to the tenth bits indicate data 141C transmitted to the input/output unit 250q (q=C). The eleventh to the sixteenth bits, of which the sixteenth bit is the most significant bit, are not used.

The dividing unit 222 divides the bit string 113 received from the receiver 221 into data having a 1-byte length, and provides the data to the reception buffer 223 to store the data. In FIG. 8, since the bit string 113 includes 16 bits, the bit string 113 is divided into two, and hence, the reception buffer 223 stores a low-order data fragment 231a and a high-order data fragment 231b.

The specifying unit 224 specifies data 141q to be transmitted to the input/output unit 250q, based on the low-order data fragment 231a and the high-order data fragment 231b stored in the reception buffer 223, and a station number q (q=A, B, C), and extracts a data fragment of 1 byte from the reception buffer 223, to provide it to the operation unit 225. In FIG. 8, four one-byte data fragments 131A, 131B, 131Cb, and 131Ca are extracted. The data fragment 131A includes the data 141A. The data fragment 131B includes the data 141B. The data fragment 131Ca includes low-order two bits of the data 141C, and the data fragment 131Cb includes high-order two bits of the data 141C.

The operation unit 225 generates a data fragment 132q to be sent to the input/output unit 250q, from a data fragment 131q extracted by the specifying unit 224. In FIG. 8, the operation unit 225 includes an AND circuit 225a to which the data fragment 131A is input, a shift register 225b to which the data fragment 131B is input, an AND circuit 225c to which the processing result by the shift register 225b is input, a shift register 225d to which the data fragment 131Ca is input, a shift register 225e to which the data fragment 131Cb is input, an OR circuit 225f to which the processing results by the shift registers 225d and 225e are input, and an AND circuit 225g to which the processing result by the OR circuit 225f is input.

The transmitter 226 stores the data fragment 132q generated by the operation unit 225 in a bit string 114q including a data field in the transmission frame, and transmits the bit string 114q to the sensor/actuator network 112.

As shown in FIGS. 9 to 11, the input/output unit 250q includes a receiver 251q, a data fragment storage unit 252q, and a comparator 253qr (r=0 to 3). Upon reception of the transmission frame transmitted by the transfer apparatus 211 via the sensor/actuator network 112, the receiver 251q extracts the bit string 114q including the data field therefrom, so that the bit string 114q is stored in the data fragment storage unit 252q. When the (r+1)th bit in the data stored in the data fragment storage unit 252q is "0", the comparator 253qr sets an output state 254qr to OFF, and when the (r+1)th bit is "1", sets the output state 254qr to ON.

The operation of the conventional data distribution system configured as described above will be explained below. In FIG. 8, the controller 110 sets a data field storing a bit string 113 ("1111111101010101" in the depicted example) including the data 141A ("01" in the depicted example) of two bits addressed to an input/output unit 250A, the data 141B ("0101" in the depicted example) of four bits addressed to an input/output unit 250B, and the data 141C ("1101" in the depicted example) of four bits addressed to an input/output unit 250C, in a transmission frame, and transmits the bit string 113 to the transfer apparatus 211 via the field network 111.

In the transfer apparatus 211, the receiver 221 extracts the bit string 113 including the data field. The extracted bit string 113 is divided by the dividing unit 222 into the low-order data fragment 231a including the low-order bytes "01010101" and the high-order data fragment 231b including the high-order bytes "11111111", and both data fragments are stored in the reception buffer 223.

The low-order data fragment 231a stored in the reception buffer 223 includes the data 141A ("01") to be transferred to the input/output unit 250A, the data 141B ("0101") to be transferred to the input/output unit 250B, and half of the data 141C (low-order 2 bits "01") to be transferred to the input/output unit 250C, and the high-order data fragment 231b includes the remaining half of the data 141C (high-order 2 bits "11") to be transferred to the input/output unit 250C.

Therefore, the specifying unit 224 stores the low-order data fragment 231a in which the data 141A to be transferred to the input/output unit 250A is stored as the data fragment 131A to the operation unit 225. Further, the specifying unit 224 stores the low-order data fragment 231a in which the data 141B to be transferred to the input/output unit 250B is stored as the data fragment 131B to the operation unit 225. Since the data 141C to be transferred to the input/output unit 250C is included in the low-order data fragment 231a and the high-order data fragment 231b, the specifying unit 224 stores the low-order data fragment 231a and the high-order data fragment 231b, as the data fragments 131Ca and 131Cb to the operation unit 225.

When all the data 141q addressed to the input/output unit 250q is included in one data fragment 131q, the operation unit 225 performs shift operation with respect to the data fragment 131q so that the data 141q is stored in order from the LSB of the data fragment 132q, and performs AND operation with respect to the data fragment 131q so that bits other than the data 141q are set to "0", to create the data fragment 132q to be sent to the transmitter 226.

On the other hand, when the data 141q is divided into two data fragments 131qa and 131qb, the data 141q is extracted from the data fragments 131qa and 131qb, to generate the data fragment 132q by performing the shift operation and OR operation so that the data 141q is stored in order of from the LSB of the data fragment 132q, to send the data fragment 132q to the transmitter 226, after setting bits other than the data 141q to "0".

In other words, all the data 141A ("01") addressed to the input/output unit 250A is included in the data fragment 131A ("01010101") output by the specifying unit 224. Therefore, the operation unit 225 can determine from the station number A that the low-order 2 bits need only to be extracted from the data fragment 131A. In order to set the bits other than the data 141A to "0", AND operation of the data fragment 131A ("01010101") and a constant "00000011" is performed by the AND circuit 225a, and the obtained data "0000001" is sent to the transmitter 226 as a data fragment 132A. The transmitter 226 creates a transmission frame having a data field in which the data fragment 132A includes a bit string 114A, and transmits the transmission frame to the input/output unit 250A.

In the input/output unit 250A, a data fragment storage unit 252A stores the bit string 114A ("0000001") extracted from the data field in the transmission frame received by a receiver 251A. A comparator 253A0 performs AND operation of the data "00000001" stored in the data fragment storage unit 252A and a constant "00000001", and since the operation result is not "0", sets an output 254A0 to ON. A comparator 253A1 performs AND operation of the data "00000001" stored in the data fragment storage unit 252A and a constant "00000010", and since the operation result is "0", sets an output 254A1 to OFF.

Further, in the operation unit 225, the data 141B ("0101") addressed to the input/output unit 250B is included in the data fragment 131B ("01010101") output by the specifying unit 224. Therefore, the operation unit 225 can determine from the station number B that the third to the sixth bits in the data fragment 131B need only to be extracted. In order to justify the bit position to the right end, the operation unit 225 provides the data fragment 131B to the shift register 225b, to shift the data bit rightward by 2 bits, to generate a data fragment 131B0 ("00010101"). In order to set bits other than the data 141B to "0", AND operation of the data fragment 131B0 ("00010101") and a constant "00001111" is performed by the AND circuit 225c, and the obtained data "0000101" is sent to the transmitter 226 as a data fragment 132B. The transmitter 226 creates a transmission frame having a data field in which the data fragment 132B includes a bit string 114B, and transmits the transmission frame to the input/output unit 250B.

In the input/output unit 250B, a data fragment storage unit 252B stores the bit string 114B ("00000101") extracted from the data field in the transmission frame received by a receiver 251B. A comparator 253B0 performs AND operation of the data "00000101" stored in the data fragment storage unit 252B and the constant "00000001", and since the operation result is not "0", sets an output 254B0 to ON. A comparator 253B1 performs AND operation of the data "00000101" stored in the data fragment storage unit 252B and the constant "00000010", and since the operation result is "0", sets an output 254B1 to OFF.

A comparator 253B2 performs AND operation of the data "00000101" stored in the data fragment storage unit 252B and a constant "00000100", and since the operation result is not "0", sets an output 254B2 to ON. A comparator 253B3 performs AND operation of the data "00000101" stored in the data fragment storage unit 252B and a constant "00001000", and since the operation result is "0", sets an output 254B3 to OFF.

On the other hand, the data 141C ("1101") addressed to the input/output unit 250C is divided into two, and included in the data fragment 131Ca ("01010101") and the data fragment 131Cb ("11111111") output by the specifying unit 224. Therefore, the operation unit 225 can determine from the station number C that the high-order 2 bits need only to be extracted from the data fragment 131Ca and the low-order 2 bits need only to be extracted from the data fragment 131Cb. In order to justify the bit position to the right end, the operation unit 225 provides the data fragment 131Ca to the shift register 225d, to shift the data bit rightward by 6 bits, to generate a data fragment 131C0 ("00000001").

Further, as for the data fragment 131Cb, in order to justify the bit position at the right end to the position of the third bit, the operation unit 225 provides the data fragment 131Cb to the shift register 225e, to shift the data bit leftward by 2 bits, to generate a data fragment 131C1 ("11111100"). To store the data fragment 141C0 and the data fragment 141C1 in a 1-byte data fragment, OR operation of the data fragment 131C0 and the data fragment 131C1 is performed by an OR circuit 225f, to generate a data fragment 131C2 ("11111101"). In order to set the bits other than the data 141C ("1101") to "0", AND operation of the data fragment 131C2 ("11111101") and a constant "00001111" is performed by the AND circuit 225g, and the result is sent to the transmitter 226 as a data fragment 132C ("0001101"). The transmitter 226 creates a transmission frame having a bit string 114c as a data field which includes the data fragment 132C, and transmits the transmission frame to the input/output unit 250C.

In the input/output unit 250C, a data fragment storage unit 252C stores the bit string 114C ("00001101") extracted from the data field in the transmission frame received by a receiver 251C. A comparator 253C0 performs AND operation of the data "00001101" stored in the data fragment storage unit 252C and the constant "00000001", and since the operation result is not "0", sets an output 254C0 to ON. A comparator 253C1 performs AND operation of the data "00001101" stored in the data fragment storage unit 252C and the constant "00000010", and since the operation result is "0", sets an output 254C1 to OFF.

A comparator 253C2 performs AND operation of the data "00001101" stored in the data fragment storage unit 252C and the constant "00000100", and since the operation result is not "0", sets an output 254C2 to ON. A comparator 253C3 performs AND operation of the data "00001101" stored in the data fragment storage unit 252C and the constant "00001000", and since the operation result is not "0", sets an output 254C3 to ON.

With reference to FIGS. 12 and 13, a process in which the transfer apparatus 211 creates the data fragment 132q (q=A to C) from the bit string 113 will be specifically explained. FIG. 12 illustrates a case in which the transfer apparatus 211 uses an 8-bit microcomputer to execute the processing. FIG. 13 is a diagram for explaining the details of the process related to part "c" shown in FIG. 12. In FIG. 13, the process in part "c" shown in FIG. 12 is shown in column (A), a processing operation actually performed by the microcomputer is shown in column (B), and the required number of clock cycles is shown in column (C). As shown in column (C), as for the number of clock cycles required when the microcomputer executes a command, if one clock cycle is required for one command, a total of 99 clock cycles are required for the process in part "c" shown in FIG. 12.

The Non-patent Literatures mentioned above are as follows:

Non-patent Literature 1: JISB3511 Standard OPCN-1 (Standard for the field network published from a government organization).

Non-patent Literature 2: EN50170 Standard PROFIBUS (Standard for the field network published from a government organization).

Non-patent Literature 3: IEC62026-2 Standard AS-interface (Standard for the sensor/actuator network published from a government organization).

Non-patent literature 4: CC-Link by CC-Link Association (Standard for the field network published from a private organization).

Non-patent Literature 5: DeviceNet by ODVA (Standard for the field network published from a private organization).

Non-patent Literature 6: CC-Link/LT by CC-Link Association (Standard for the sensor/actuator network published from the private organization).

However, according to the conventional processing method, a bit shift operation is required when the transfer apparatus transfers data to the input/output unit, thereby causing a problem in that it takes time to perform processing for creating a transmission frame addressed to the input/output unit.

The time required until the transfer apparatus finishes processing for distributing data to all input/output units through the sensor/actuator network is calculated by multiplying the processing time for one unit by the number of input/output units. Therefore, there is a problem in that a delay in the processing due to the shift process causes performance deterioration in the distribution processing.

The present invention has been achieved in order to solve the above problems. It is an object of the present invention to provide a data distribution system, which does not require the bit shift operation by the transfer apparatus.

DISCLOSURE OF THE INVENTION

According to the present invention, a data distribution system includes a controller that transmits a bit string including a plurality of individual data, a transfer apparatus that receives the bit string from the controller, extracts the individual data from the bit string received, and transfers the individual data to corresponding input/output units, and a plurality of input/output units, each of which controls an input/output state based on the individual data received from the transfer apparatus. The transfer apparatus includes a dividing unit that divides the bit string received from the controller, into data fragments having a size easy to handle, a specifying unit that specifies, from the data fragments, a data fragment that includes the individual data addressed to a target input/output unit, an operating unit that processes the specified data fragment without performing a bit shift operation, generates one target data fragment for each of the input/output units, and a transmitting unit that transmits the target data fragment and template information to the respective input/output units, and a transmitting unit that transmits the target data fragment and template information to the respective input/output units, where the template information indicates an area where the individual data relative to the corresponding input/output unit is stored in the target data fragment. The input/output unit includes storing units that store the target data fragment and the template information received from the transfer apparatus, and an extracting unit that extracts the individual data used by the input/output unit from the target data fragment received from the transfer apparatus, based on the template information stored.

According to the present invention, because the bit shift operation by the transfer apparatus is not required, a data fragment to be transmitted to the input/output unit can be generated in short time. Therefore, it is possible to improve the processing efficiency of the process in which one controller distributes individual data to a plurality of input/output units.

BRIEF DESCRIPTION OF THE DRAWINGS

FIG. 3 is a diagram for specifically explaining a process in which a transfer apparatus shown in FIG. 2 creates a transmission frame addressed to the input/output units in the group based on a transmission frame received from a controller;

FIG. 4 is a diagram for explaining details of the process related to part "a" shown in FIG. 3;

FIG. 5 is a diagram for specifically explaining the process in which the input/output unit shown in FIG. 2 determines an output state from the transmission frame received from the transfer apparatus (when an output port has the same address);

FIG. 6 is a diagram for specifically explaining the process in which the input/output unit shown in FIG. 2 determines an output state from the transmission frame received from the transfer apparatus (when the output port has a different address);

FIG. 7 is a diagram for explaining details of the process related to part "b" shown in FIG. 6;

FIG. 8 is a diagram for explaining a configuration of a conventional hierarchical data distribution system and a process executed by a transfer apparatus;

FIG. 12 is a diagram for specifically explaining a process in which the transfer apparatus shown in FIG. 8 creates a data fragment to be transmitted to the respective input/output units based on a bit string received from the controller;

FIG. 13 is a diagram for explaining details of the process related to part "c" shown in FIG. 12;

FIG. 18 is a diagram for specifically explaining a process in which the transfer apparatus shown in FIG. 14 creates a data fragment to be transmitted to the respective input/output units based on a bit string received from the controller;

FIG. 19 is a diagram for explaining details of the process related to part "d" shown in FIG. 18;

FIG. 20 is a diagram for specifically explaining a process in which the input/output unit shown in FIG. 14 determines an input/output state based on the bit string received from the transfer apparatus; and FIG. 21 is a diagram for explaining details of the process related to part "e" shown in FIG. 20.

BEST MODE FOR CARRYING OUT THE INVENTION

Exemplary embodiments of a data distrubution system according to the present invention will be explained in detail with reference to the accompanying drawings.

Figure 1:
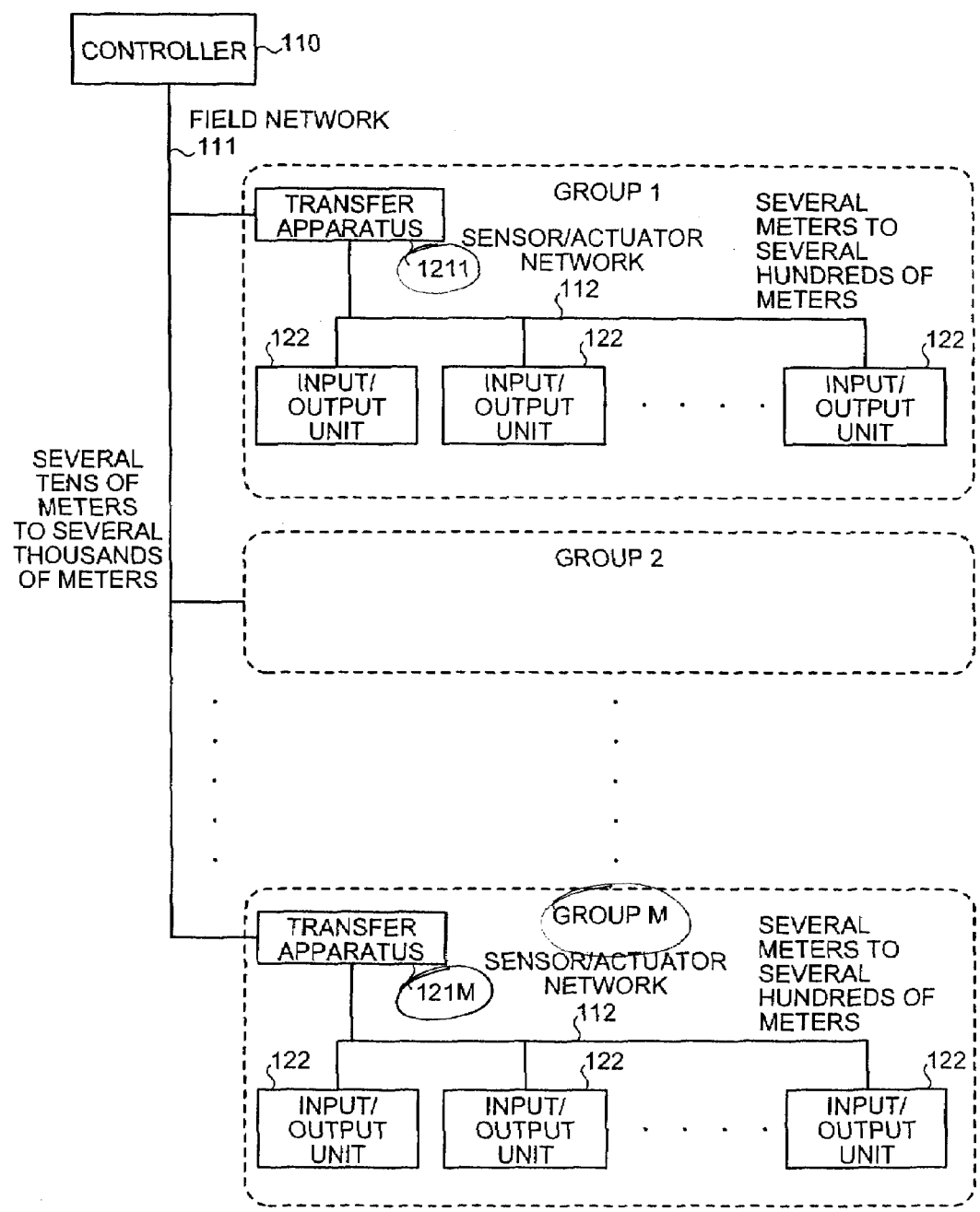
FIG. 1 is a conceptual diagram of a field network and a sensor/actuator network that are hierarchical.
Figure 2:
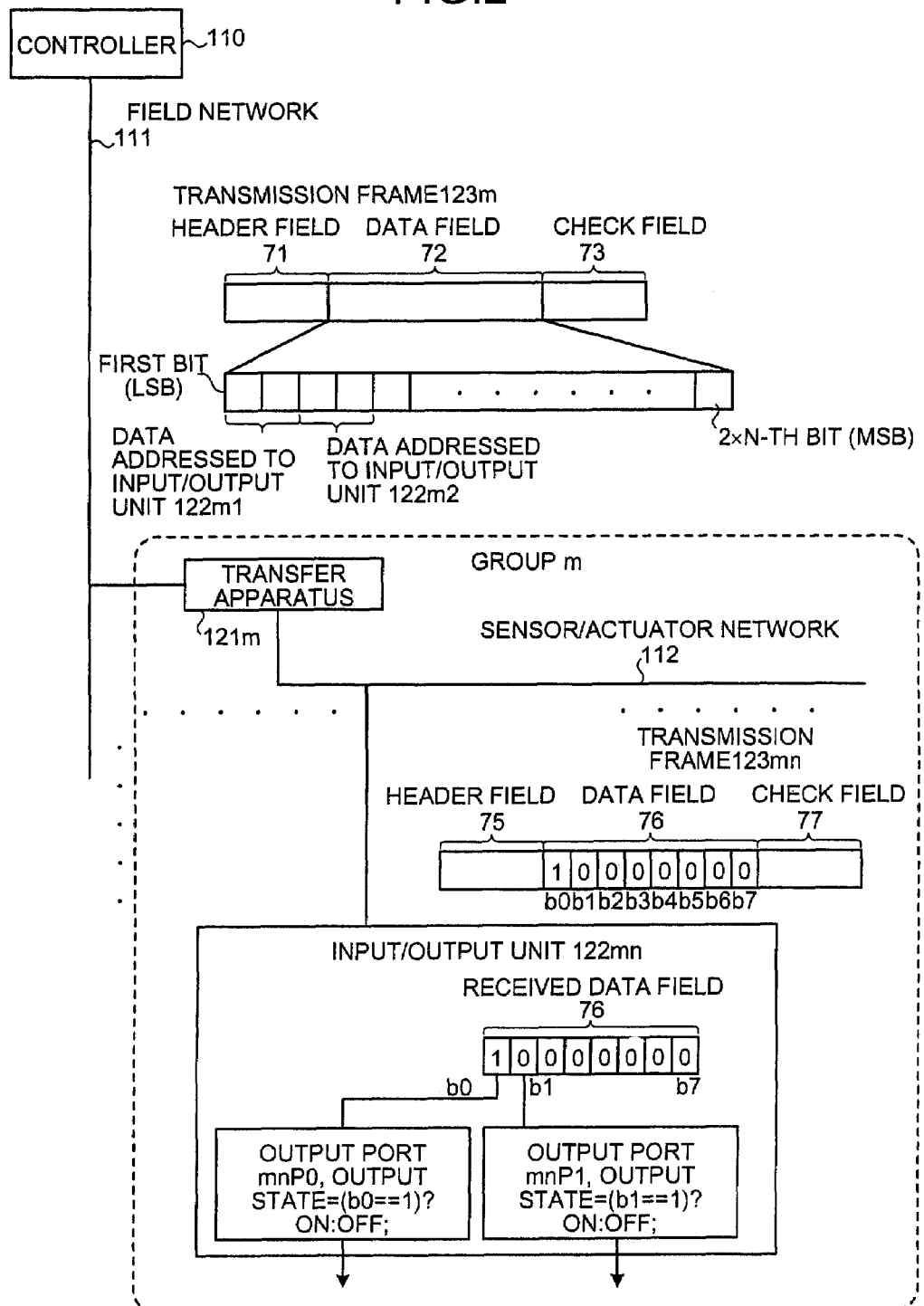
FIG. 2 is a diagram for explaining data distribution to input/output units performed in one group shown in FIG. 1.
Figure 9:
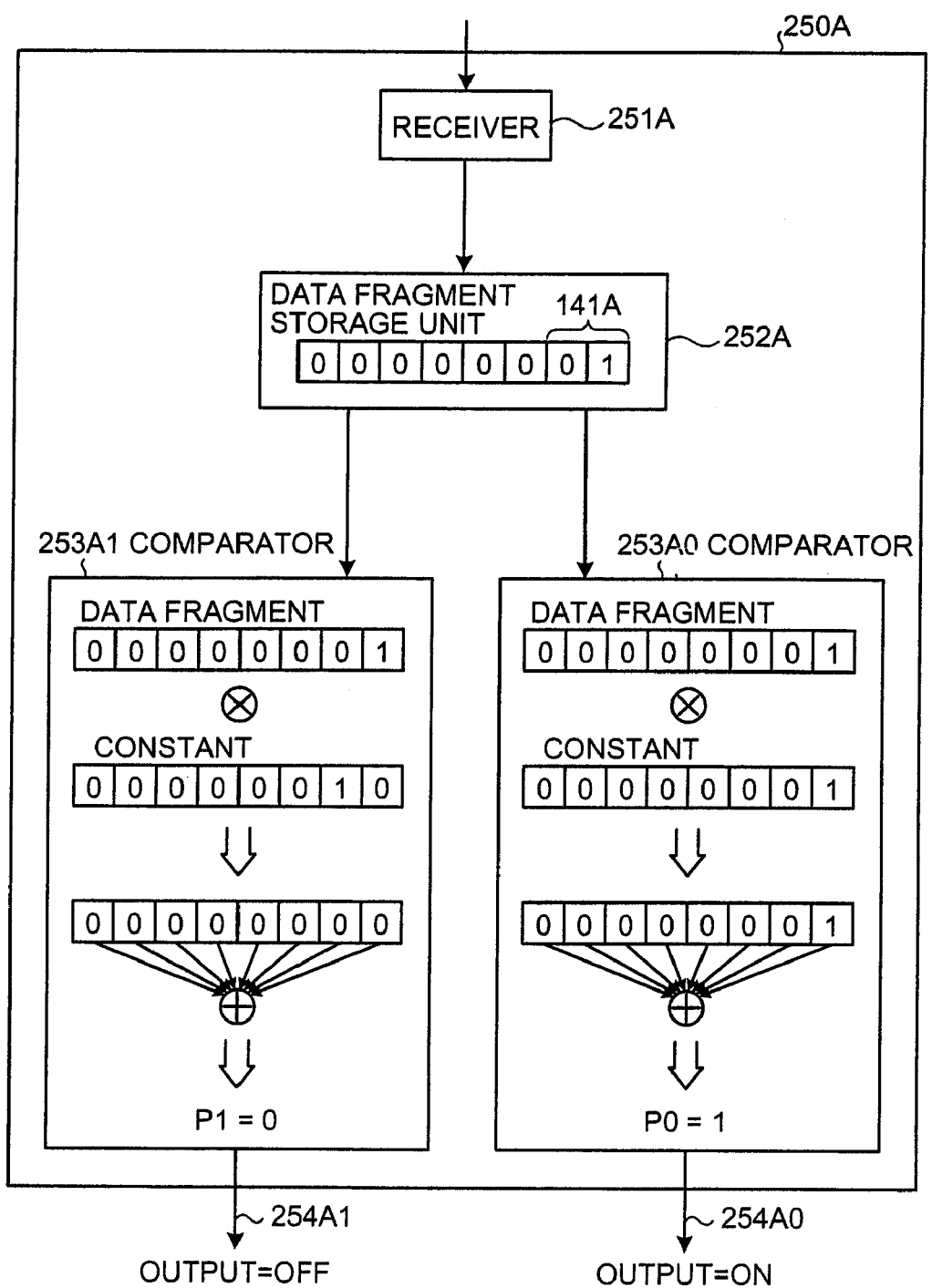
FIG. 9 is a diagram for explaining a configuration and a process executed by an input/output unit in the conventional data distribution system shown in FIG. 8.
Figure 10:
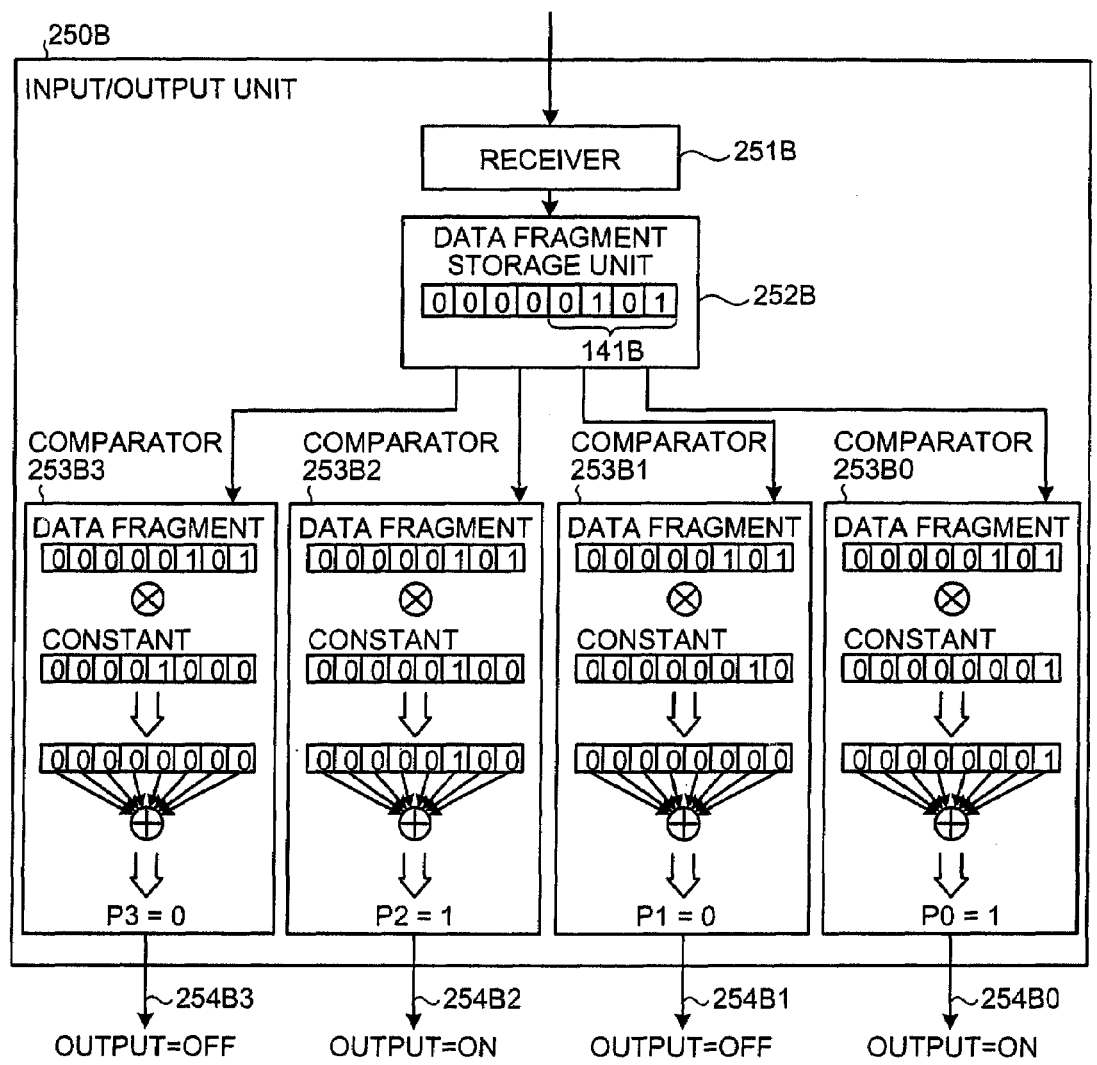
FIG. 10 is a diagram for explaining a configuration and a process executed by another input/output unit in the conventional data distribution system shown in FIG. 8.
Figure 11:
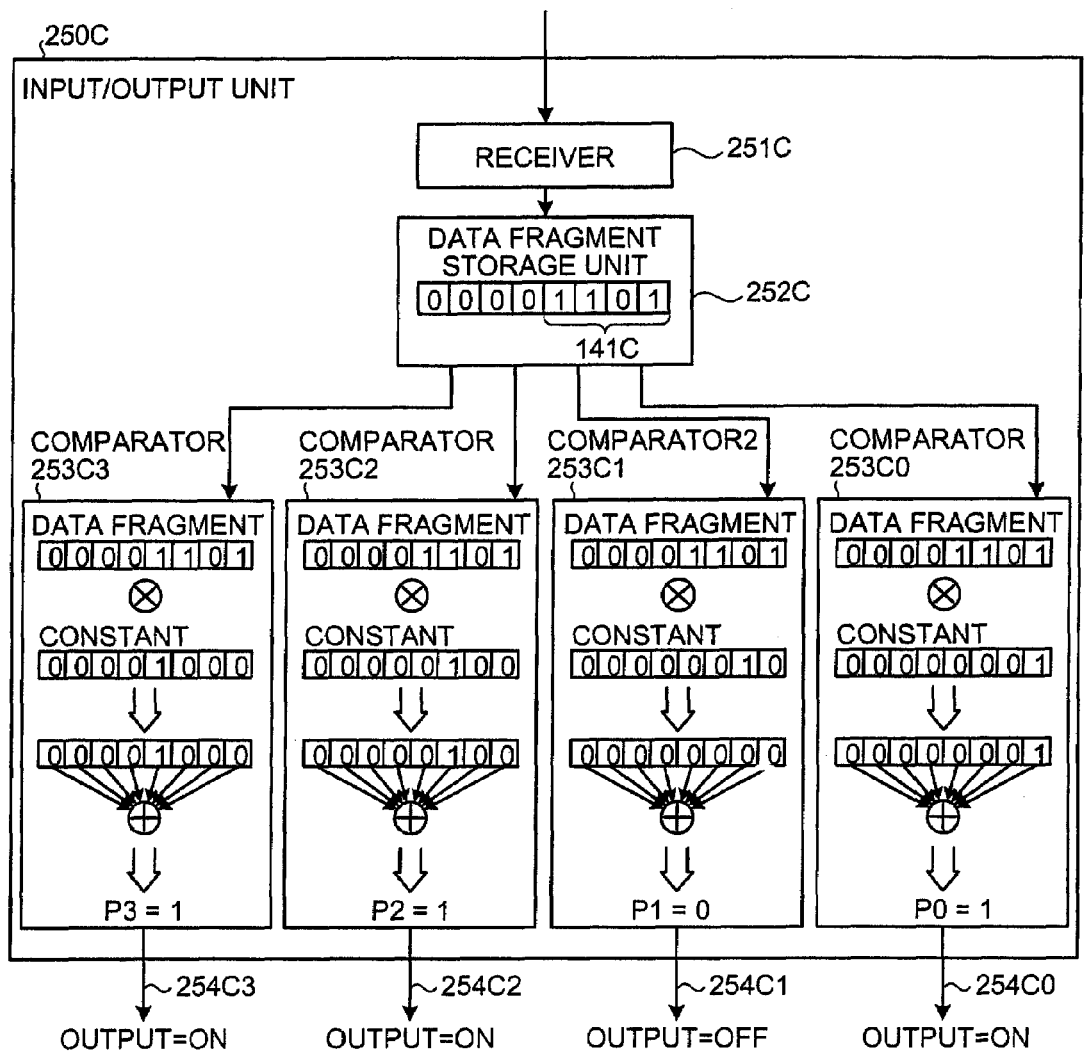
FIG. 11 is a diagram for explaining a configuration and a process executed by still another input/output unit in the conventional data distribution system shown in FIG. 8.
Figure 14:
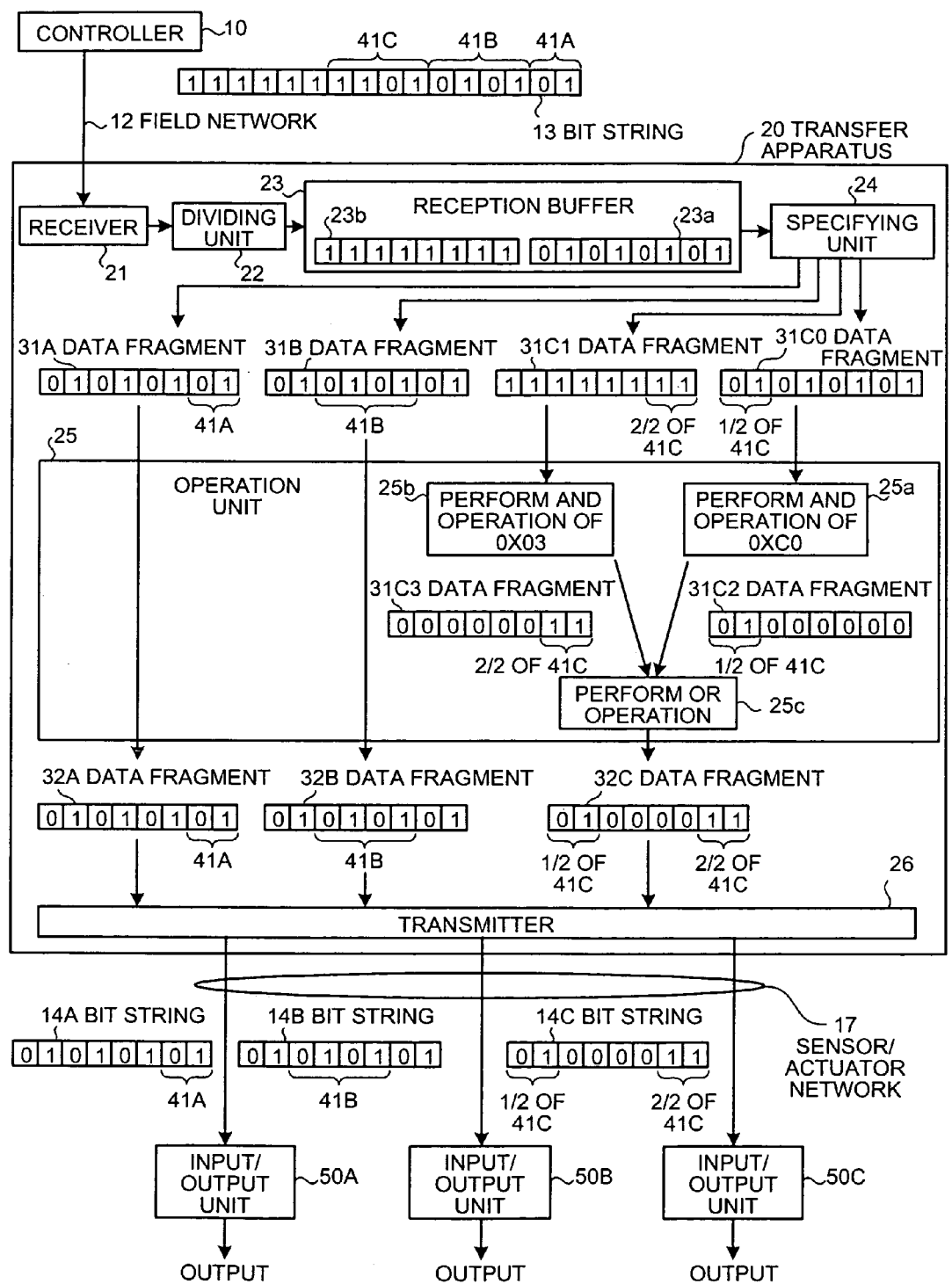
FIG. 14 is a diagram for explaining a configuration of a data distribution system and a process executed by a transfer apparatus according to one embodiment of the present invention.
Figure 15:
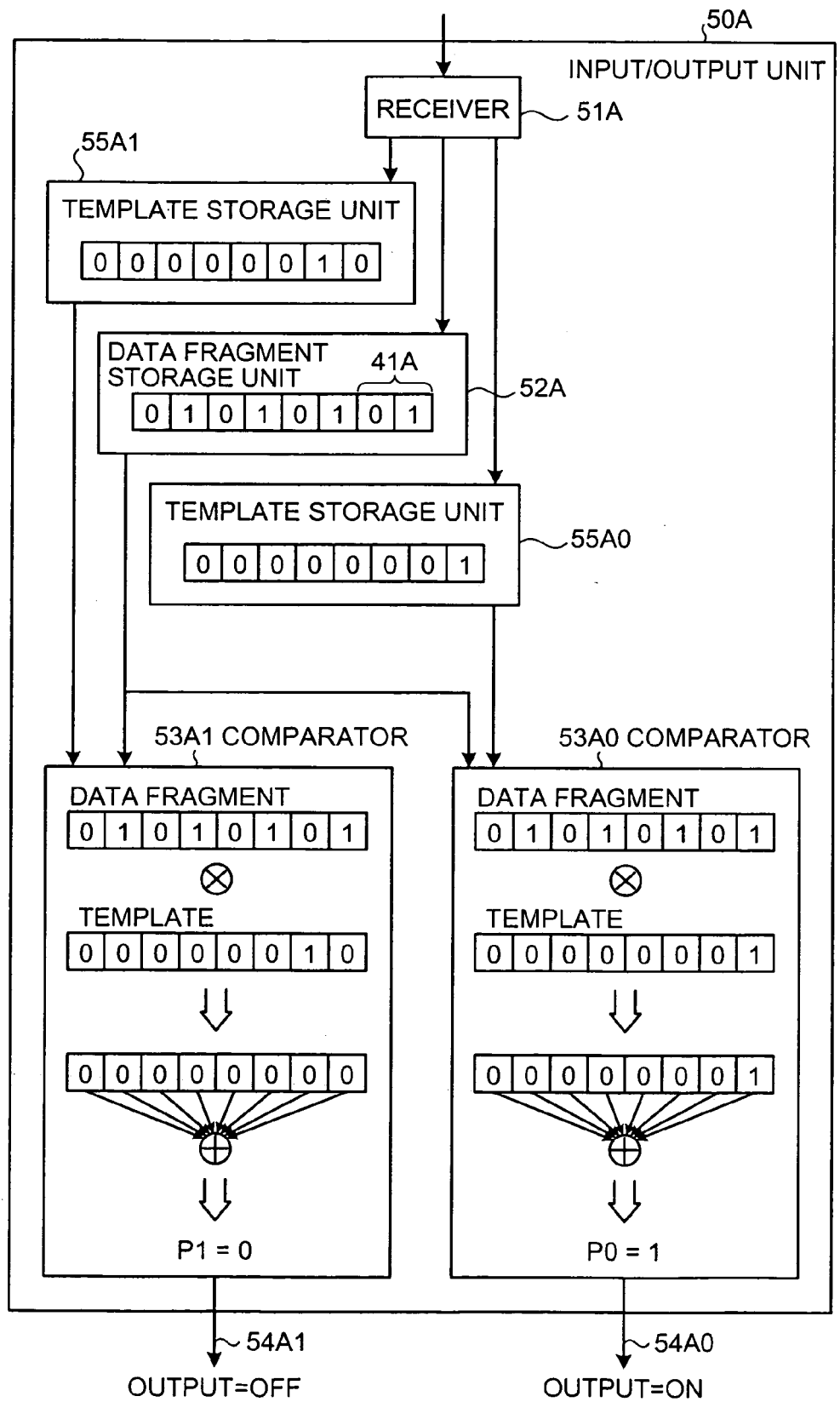
FIG. 15 is a diagram for explaining the configuration and the process executed by an input/output unit shown in FIG. 14.
Figure 16:
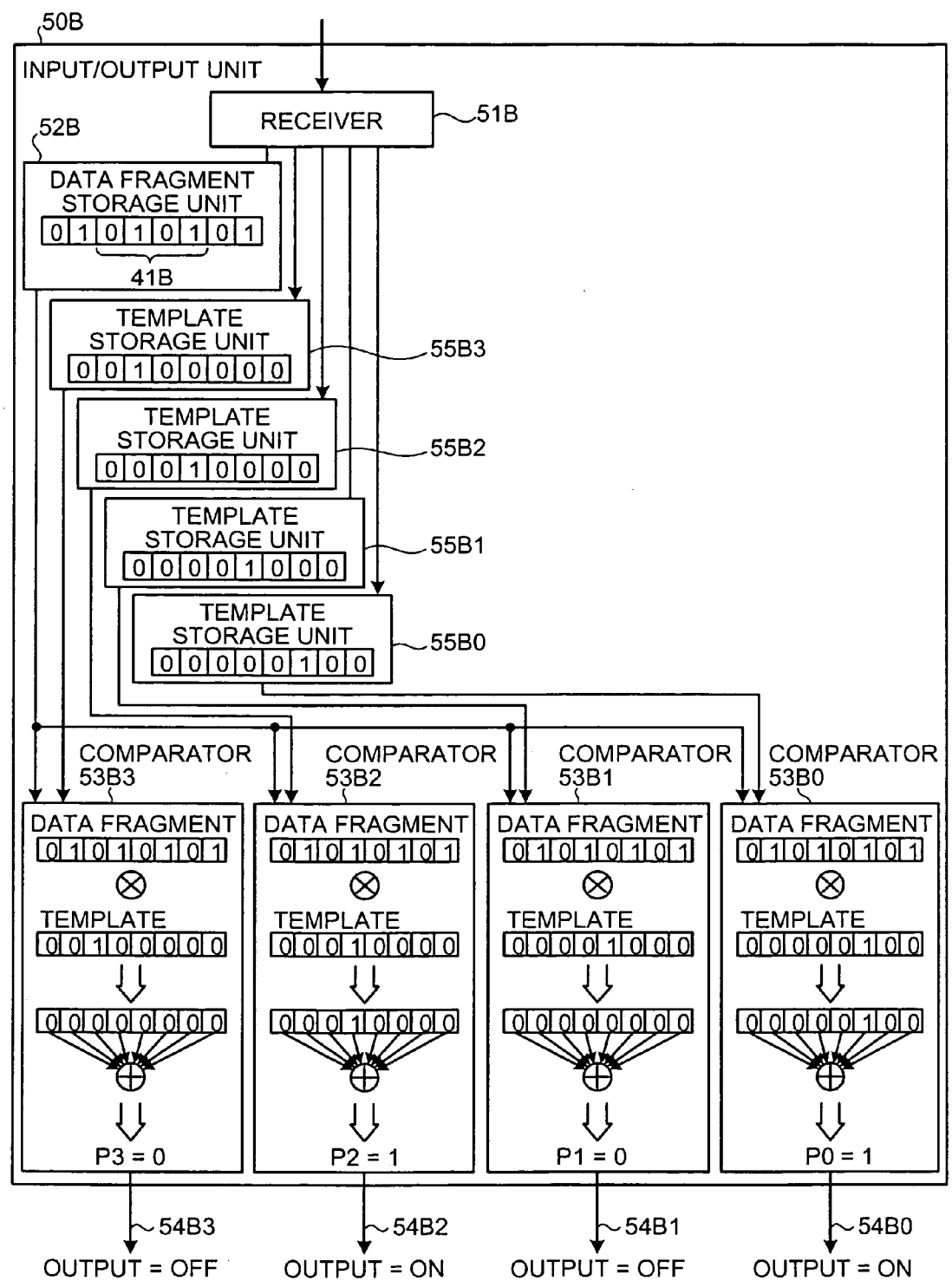
FIG. 16 is a diagram for explaining the configuration and the process executed by another input/output unit shown in FIG. 14.
Figure 17:
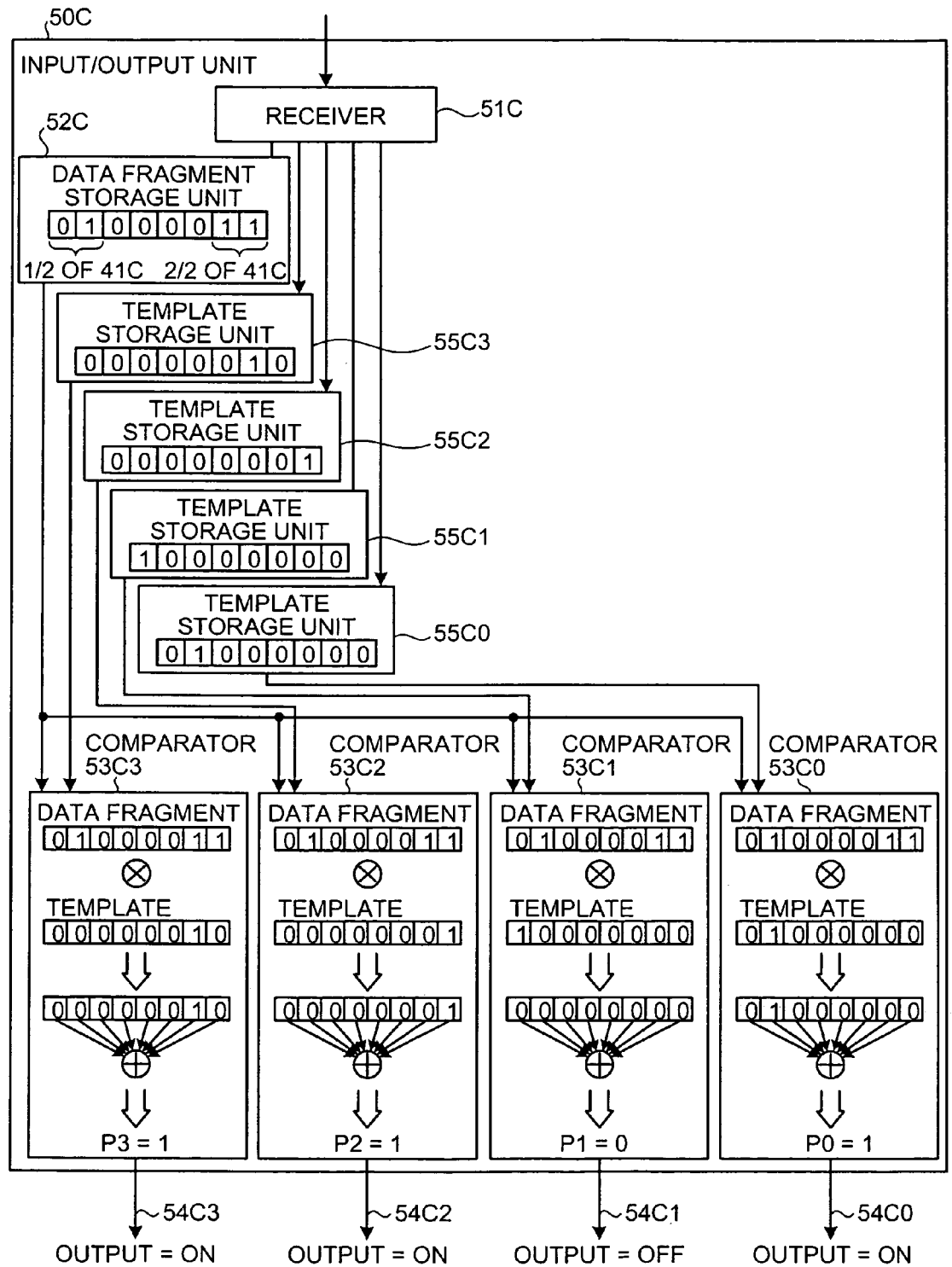
FIG. 17 is a diagram for explaining the configuration and the process executed by still another input/output unit shown in FIG. 14.

FIG. 14 is a diagram for explaining a configuration of a data distribution system and a process executed by a transfer apparatus according to one embodiment of the present invention. FIG. 14 illustrates a case in which a controller 10 that controls the whole system performs setting control of output state of an object to be controlled, with respect to three input/output units $50q$ (q=A, B, C) via a transfer apparatus 20. The transfer apparatus 20 is connected to the controller 10 via a field network 12, and to the input/output units $50q$ via a sensor/actuator network 17. The configuration and the processing content of the input/output units $50q$ are shown in FIGS. 15 to 17.

The transfer apparatus 20 includes a receiver 21, a dividing unit 22, a reception buffer 23, a specifying unit 24, an operation unit 25, and a transmitter 26. Upon receiving a transmission frame transmitted by the controller 10 via the field network 12, the receiver 21 extracts a bit string 13 including a data field, and provides the bit string to the dividing unit 22.

In FIG. 14, the bit string 13 includes 16 bits. The position of the LSB in the bit string 13 is at the right end, and the position of the MSB is at the left end. In the bit string 13, the first and the second bits on the lowest order side indicate data 41A, the third to the sixth bits indicate data 41B, the seventh to the tenth bits indicate data 41C, and the eleventh to the sixteenth bits, of which the sixteenth bit is the most significant bit, are not used. Data $41q$ is data to be transmitted to the input/output unit $50q$.

The dividing unit 22 divides the bit string 13 received from the receiver 21 into data having a 1-byte length, and provides the data to the reception buffer 23 to store the data. In FIG. 14, since the bit string 13 includes 16 bits, the bit string 13 is divided into two, and hence, the reception buffer 23 stores a low-order data fragment 23a and a high-order data fragment 23b.

The specifying unit 24 specifies data $41q$ to be transmitted to the input/output unit $50q$, based on the low-order data fragment 23a and the high-order data fragment 23b stored in the reception buffer 23, and a station number q (q=A, B, C), and extracts a data fragment of 1 byte from the reception buffer 23, to provide it to the operation unit 25. In FIG. 14, four one-byte data fragments 31A, 31B, 31C1, and 31C0 are extracted. The data fragment 31A includes the data 41A. The data fragment 31B includes the data 41B. The data fragment 31C1 includes high-order two bits of the data 41C, and the data fragment 31C0 includes low-order two bits of the data 41C.

The operation unit 25 generates a data fragment $32q$ to be sent to the input/output unit $50q$, from the data fragments 31A, 31B, 31C1, and 31C0 extracted by the specifying unit 24. In FIG. 14, the operation unit 25 includes an AND circuit 25b to which the data fragment 31C1 is input, an AND circuit 25a to which the data fragment 31C0 is input, and an OR circuit 25c to which the processing result by the AND circuits 25b and 25a is input.

The transmitter 26 stores the data fragment 32q generated by the operation unit 25 in a bit string 14q including a data field in the transmission frame, and transmits the bit string 14q to the sensor/actuator network 17.

As shown in FIGS. 15 to 17, the input/output unit 50q includes a receiver 51q, a data fragment storage unit 52q, template storage units 55qr (r=0 to 3), and comparators 53qr (r=0 to 3). Though not shown, template information, including a bit pattern indicating an area in which the data 41q applied to the input/output unit 50q is stored in the bit string 14q to be transmitted by the transfer apparatus 20, is input to the input/output unit 50q in one-to-one correspondence with the comparators 53qr. In the embodiment, the transfer apparatus 20 transfers the template information before starting data distribution process to the input/output unit 50q, such as at the time of startup of the system.

Upon reception of the transmission frame transmitted by the transfer apparatus 20 onto the sensor/actuator network 17, the receiver 51q extracts the bit string 14q including the data field therefrom, so that the bit string 14q is stored in the data fragment storage unit 52q. The receiver 51q also allows a template storage unit 55qr to store the template information received separately from the transfer apparatus 20. The comparator 53qr performs AND operation of the data fragment 14q stored by the data fragment storage unit 52q and the template information stored by the template storage unit 55qr, and when the result is "0", sets an output state 54qr to OFF, and when the result is not "0", sets the output state 54qr to ON.

The operation of the data distribution system according to the embodiment configured as described above will be explained below. In FIG. 14, the transfer apparatus 20 receives an instruction from the controller 10 before starting the data distribution processing to the input/output unit 50q, and transmits the template information to the respective input/output units 50q. As a result, in the input/output units 50q, the template information is stored in the template storage unit 55qr.

In other words, in input/output unit 50A, template information "00000001" is stored in a template storage unit 55A0, and template information "00000010" is stored in a template storage unit 55A1. In input/output unit 50B, template information "00000100" is stored in a template storage unit 55B0, template information "00001000" is stored in a template storage unit 55B1, template information "00010000" is stored in a template storage unit 55B2, and template information "00100000" is stored in a template storage unit 55B3. In input/output unit 50C, template information "01000000" is stored in a template storage unit 55C0, template information "10000000" is stored in a template storage unit 55C1, template information "00000001" is stored in a template storage unit 55C2, and template information "00000010" is stored in a template storage unit 55C3.

After the transfer apparatus 20 finishes the preprocessing described above, the controller 10 sets in a transmission frame, a data field that stores the bit string 13 ("1111111101010101" in the depicted example) including the data 41A ("01" in the depicted example) of two bits addressed to the input/output unit 50A, the data 41B ("0101" in the depicted example) of four bits addressed to the input/output unit 50B, and the data 41C ("1101" in the depicted example) of four bits addressed to the input/output unit 50C, and transmits the bit string 13 to the transfer apparatus 20 via the field network 12.

In the transfer apparatus 20, the receiver 21 extracts the bit string 13 including the data field. The extracted bit string 13 is divided by the dividing unit 22 into the low-order data fragment 23a including the low-order bytes "01010101" and the high-order data fragment 23b including the high-order bytes "11111111", and the both data fragments are stored in the reception buffer 23.

The low-order data fragment 23a stored in the reception buffer 23 includes the data 41A ("01") to be transferred to the input/output unit 50A, the data 41B ("0101") to be transferred to the input/output unit 50B, and half of the data 41C (low-order 2 bits "01") to be transferred to the input/output unit 50C, and the high-order data fragment 23b includes the remaining half of the data 41C (high-order 2 bits "11") to be transferred to the input/output unit 50C.

Therefore, the specifying unit 24 stores to the low-order data fragment 23a in which the data 41A to be transferred to the input/output unit 50A is stored as the data fragment 31A to the operation unit 25. Further, the specifying unit 24 stores the low-order data fragment 23a in which the data 41B to be transferred to the input/output unit 50B is stored as the data fragment 31B to the operation unit 25. Because the data 41C to be transferred to the input/output unit 50C is included in the low-order data fragment 23a and the high-order data fragment 23b, the specifying unit 24 store the low-order data fragment 23a and the high-order data fragment 23b as the data fragments 31C0 and 31C1 to the operation unit 25.

When the entire data 41q addressed to the input/output unit 50q is included in one data fragment 31q, the operation unit 25 designates the data fragment 31q as the data fragment 32q to be sent to the transmitter 26, without performing any special processing. On the other hand, when the data 41q is divided into two data fragments 31q0 and 31q1, the operation unit 25 sets bits other than the data 41q in the data fragments 31q0 and 31q1 to "0", and generates the data fragment 32q to be sent to the transmitter 26, by performing OR operation of the two data fragments.

In other words, in the operation unit 25, all of the data 41A ("01") addressed to the input/output unit 50A is included in the data fragment 31A ("01010101") output by the specifying unit 24. Therefore, the operation unit 25 sends the data fragment 31A as data fragment 32A directly to the transmitter 26. The transmitter 26 creates a transmission frame having a bit string 14A as a data field which includes the data fragment 32A, to transmit the transmission frame to the input/output unit 50A via the sensor/actuator network 17.

In the input/output unit 50A, data fragment storage unit 52A stores the bit string 14A ("01010101") extracted from the data field in the transmission frame received by receiver 51A. A comparator 53A0 performs AND operation of the data "01010101" stored in the data fragment storage unit 52A and the template information "00000001" stored in the template storage unit 55A0, and since the operation result is not "0", sets an output 54A0 to ON. A comparator 53A1 performs AND operation of the data "01010101" stored in the data fragment storage unit 52A and the template information "00000010" stored in the template storage unit 55A1, and since the operation result is "0", sets an output 54A1 to OFF.

Further, in the operation unit 25, all the data 41B ("0101") addressed to the input/output unit 50B is included in the data fragment 31B ("01010101") output by the specifying unit 24. Therefore, the operation unit 25 sends the data fragment 31B as data fragment 32B directly to the transmitter 26. The transmitter 26 creates a transmission frame having a bit string 14B as a data field which includes the data fragment 32B, to transmit the transmission frame to the input/output unit 50B via the sensor/actuator network 17.

In the input/output unit 50B, data fragment storage unit 52B stores the bit string 14B ("01010101") extracted from the data field in the transmission frame received by receiver 51B. A comparator 53B0 performs AND operation of the data "01010101" stored in the data fragment storage unit 52B and the template information "00000100" stored in the template storage unit 55B0, and since the operation result is not "0", sets an output 54B0 to ON. A comparator 53B1 performs AND operation of the data "01010101" stored in the data fragment storage unit 52B and the template information "00001000" stored in the template storage unit 55B1, and since the operation result is "0", sets an output 54B1 to OFF.

A comparator 53B2 performs AND operation of the data "01010101" stored in the data fragment storage unit 52B and the template information "00010000" stored in the template storage unit 55B2, and since the operation result is not "0", sets an output 54B2 to ON. A comparator 53B3 performs AND operation of the data "01010101" stored in the data fragment storage unit 52B and the template information "00100000" stored in the template storage unit 55B3, and since the operation result is "0", sets an output 54B3 to OFF.

On the other hand, the data 41C addressed to the input/output unit 50C is divided into two, and included in the data fragment 31C0 ("01010101") and the data fragment 31C1 ("11111111") output by the specifying unit 24. Therefore, the operation unit 25 can determine from the station number C that the high-order 2 bits need only to be extracted from the data fragment 31C0 and the low-order 2 bits need only to be extracted from the data fragment 31C1. In order to set bits other than the high-order 2 bits to "0" in the data fragment 31C0, the AND circuit 25a of the operation unit 25 performs AND operation of the data fragment 31C0 ("01010101") and a constant "11000000", to generate a data fragment 31C2 ("01000000").

For the data fragment 31C1, AND operation of the data fragment 31C1 ("11111111") and a constant "00000011" is performed by the AND circuit 25b in order to set bits other than the low-order 2 bits to "0", to generate a data fragment 31C3 ("00000011"). Further, the OR circuit 25c performs OR operation of the data fragment 31C2 and the data fragment 31C3 to generate a data fragment 32C ("01000011"), and provides the data fragment 32C to the transmitter 26. The transmitter 26 creates a transmission frame having a bitt string 14C as a data field which includes the data fragment 32C, and transmits the transmission frame to the input/output unit 50C via the sensor/actuator network 17.

In the input/output unit 50C, data fragment storage unit 52C stores the bit string 14C ("01000011") extracted from the data field in the transmission frame received by receiver 51C. A comparator 53C0 performs AND operation of the data "01000011" stored in the data fragment storage unit 52C and the template information "01000000" stored in the template storage unit 55C0, and since the operation result is not "0", sets an output 54C0 to ON. A comparator 53C1 performs AND operation of the data "01000011" stored in the data fragment storage unit 52C and the template information "10000000" stored in the template storage unit 55C1, and since the operation result is "0", sets an output 54C1 to OFF.

A comparator 53C2 performs AND operation of the data "01000011" stored in the data fragment storage unit 52C and the template information "00000001" stored in the template storage unit 55C2, and since the operation result is not "0", sets an output 54C2 to ON. A comparator 53C3 performs AND operation of the data "01000011" stored in the data fragment storage unit 52B and the template information "00000010" stored in the template storage unit 55C3, and since the operation result is not "0", sets an output 54C3 to ON.

The process in which the transfer apparatus 20 creates the data fragment $32q$ from the bit string 13 will be explained specifically with reference to FIGS. 18 and 19. FIG. 18 illustrates a case in which the transfer apparatus 20 uses an 8-bit microcomputer to execute the process. FIG. 19 is a diagram for explaining details of the process related to part "d" shown in FIG. 18.

In the transfer process in FIG. 18, a constant defining unit defines constants, a variable defining unit declares variables, and a variable initializing unit defines an initial value of the variables. Next, the value of the bit string 13 is stored in a variable d13 according to a function get_field_network-_data( ), to execute the process in order of data transmission to the input/output units $50q$ in a subsequent for-loop.

In FIG. 19, the processing in part "d" shown in FIG. 18 is shown in column (A), a processing operation actually performed by a microcomputer is shown in column (B), and the required number of clock cycles is shown in column (C). In column (C), the number of clock cycles required for the microcomputer to perform the process for one line is expressed as 1, the number of clock cycles for lines that are not executed as a result of condition decision is expressed as 0, and the number of clock cycles for lines to be executed is expressed as 1, and the total of number of clock cycles 30 is shown in the lowermost line.

That is, in the conventional example (FIG. 13), 99 clock cycles are required for the data transfer process. However, in the embodiment, because the transfer process can be finished within 30 clock cycles, it is understood that the processing time of the transfer apparatus can be considerably reduced.

FIGS. 20 and 21 are diagrams for specifically explaining the process in which the input/output unit $50q$ determines the output state from data stored in the data fragment storage unit $52q$. FIG. 20 illustrates a case that the input/output unit $50q$ uses an 8-bit microcomputer to execute the processing. FIG. 21 illustrates details of the process related to part "e" shown in FIG. 20.

In FIG. 20, in the input/output unit, a constant defining unit defines constants, a variable defining unit declares variables, and after the variables are assigned values for each of the input/output units, the value of the bit string $14q$ is fetched, to determine the state of an output $54qk$ (k=0 to 3).

In FIG. 21, the processing in part "e" shown in FIG. 20 is shown in column (A), a processing operation actually performed by a microcomputer is shown in column (B), and the required number of clock cycles is shown in column (C). In column (C), it is seen that 12 clock cycles are required for executing the process in part "e" shown in FIG. 20. For the corresponding process in the conventional example (FIG. 7), the number of clock cycles required for executing the processing is 12 clock cycles. Thus, in the present embodiment, the total processing time of the transfer apparatus can be considerably reduced, while maintaining the processing time of the input/output unit.

INDUSTRIAL APPLICABILITY

The present invention is suitable as a data distribution system in which one controller distributes individual data to a plurality of input/output units, and the processing efficiency of which is improved.

The invention claimed is:

1. A data distribution system comprising:
a controller that transmits a bit string including a plurality of individual data;
a transfer apparatus that receives the bit string from the controller, extracts the individual data from the bit string received, and transfers the individual data to corresponding input/output units; and
a plurality of input/output units, each of which controls an input/output state based on the individual data received from the transfer apparatus, wherein
the transfer apparatus includes
a dividing unit that divides the bit string received from the controller into data fragments;
a specifying unit that specifies, from the data fragments, a specified data fragment that includes the individual data addressed to a target input/output unit;
an operating unit that processes the specified data fragment without performing a bit shift operation, generates a target data fragment for each of the input/output units, and transmits the target data fragment to a respective input/output unit of the plurality of input/output units through a transmitting unit; and
the transmitting unit that transmits the target data fragments and template information to the respective input/output units, wherein the template information indicates an area where the individual data relative to the respective input/output unit is stored in the target data fragment, and at least one of the plurality of input/output unit includes
a storing unit that stores the template information received from the transfer apparatus; and
an extracting unit that extracts the individual data used by the respective input/output unit from the target data fragment received from the transfer apparatus, based on the template information stored.

* * * * *